United States Patent
Harada et al.

[11] Patent Number: 6,072,476
[45] Date of Patent: Jun. 6, 2000

[54] APPARATUS AND METHOD FOR DISPLAYING IMAGES

[75] Inventors: Hiromi Harada; Terumasa Kayashima; Tatsuhiro Nozue, all of Yokohama, Japan

[73] Assignee: Hitachi, Ltd., Tokyo, Japan

[21] Appl. No.: 08/677,613

[22] Filed: Jul. 9, 1996

[30] Foreign Application Priority Data

Jul. 10, 1995 [JP] Japan ................................. 7-173791

[51] Int. Cl.⁷ .................................................. G09G 5/00
[52] U.S. Cl. .............................. 345/204; 345/1; 345/901
[58] Field of Search .............................. 345/1, 3, 87, 92, 345/204, 901, 903

[56] References Cited

U.S. PATENT DOCUMENTS

| | | | |
|---|---|---|---|
| 4,854,878 | 8/1989 | Malvino et al. | 434/335 |
| 4,997,374 | 3/1991 | Simone | 434/317 |
| 5,167,508 | 12/1992 | Mc Taggart | 434/317 |
| 5,239,665 | 8/1993 | Tsuchiya | 395/800 |
| 5,275,569 | 1/1994 | Watkins | 434/157 |
| 5,339,091 | 8/1994 | Yamazaki et al. | 345/104 |
| 5,467,102 | 11/1995 | Kuno et al. | 345/1 |
| 5,534,888 | 7/1996 | Lebby et al. | 345/121 |
| 5,558,520 | 9/1996 | Werzberger | 434/317 |
| 5,686,790 | 11/1997 | Curtin et al. | 313/493 |
| 5,696,982 | 12/1997 | Tanigawa et al. | 395/790 |

FOREIGN PATENT DOCUMENTS

| | | |
|---|---|---|
| 3-217959 | 9/1991 | Japan . |
| 4-355786 | 12/1992 | Japan . |
| 5-61423 | 3/1993 | Japan . |
| 6-138839 | 5/1994 | Japan . |

*Primary Examiner*—Amare Mengistu
*Attorney, Agent, or Firm*—Frohwitter; R. William Beard, Jr.

[57] ABSTRACT

An image display device includes a main body having a display unit with a first display screen A and a display unit with a second display screen B and a link 56 for merging the two display screens to one. The two display units are opened and closed at the link so that the display screens are folded over each other for carrying like a book, and they are opened in a use mode to permit the recognition of the display image.

9 Claims, 36 Drawing Sheets

$$\begin{cases} \dfrac{1}{b} - \dfrac{1}{a} = \dfrac{1}{f} & (1) \\ \dfrac{L}{L'} = \dfrac{b}{a} & (2) \end{cases}$$

a : DISTANCE BETWEEN MAGNIFICATION LENS AND LCD VIRTUAL IMAGE
b : DISTANCE BETWEEN MAGNIFICATION LENS AND LCD
f : FOCAL DISTANCE OF MAGNIFICATION LENS
L : LENGTH OF LCD
L': LENGTH OF LCD VIRTUAL IMAGE

DATA MAGNIFICATION PROCESS FLOW

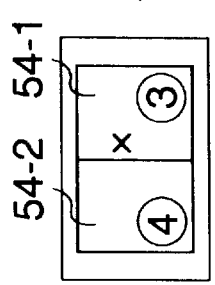
FIG. 20A  CONCURRENTLY MAGNIFY TWO PAGES ③, ④
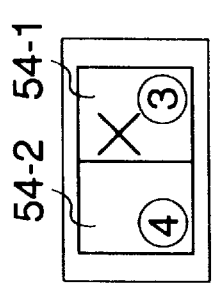
FIG. 20B  MAGNIFY ONLY PAGE ③ WHILE LEAVING ④ AS IT IS
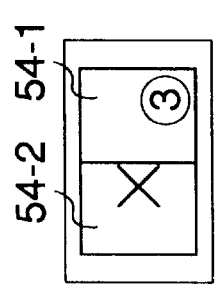
FIG. 20C  MAGNIFY ONLY PAGE ③ TO DUAL SCREENS (LANDSCAPE AND PORTRAIT ARE SELECTABLE)
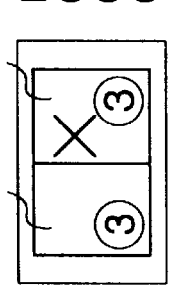
FIG. 20D  IN MAGNIFICATION MODE STANDARD DISPLAY IS MADE ON ONE SCREEN AND MAGNIFIED DISPLAY IS MADE ON OTHER SCREEN
OVERALL DISPLAY IS ALWAYS MADE ON ONE SCREEN

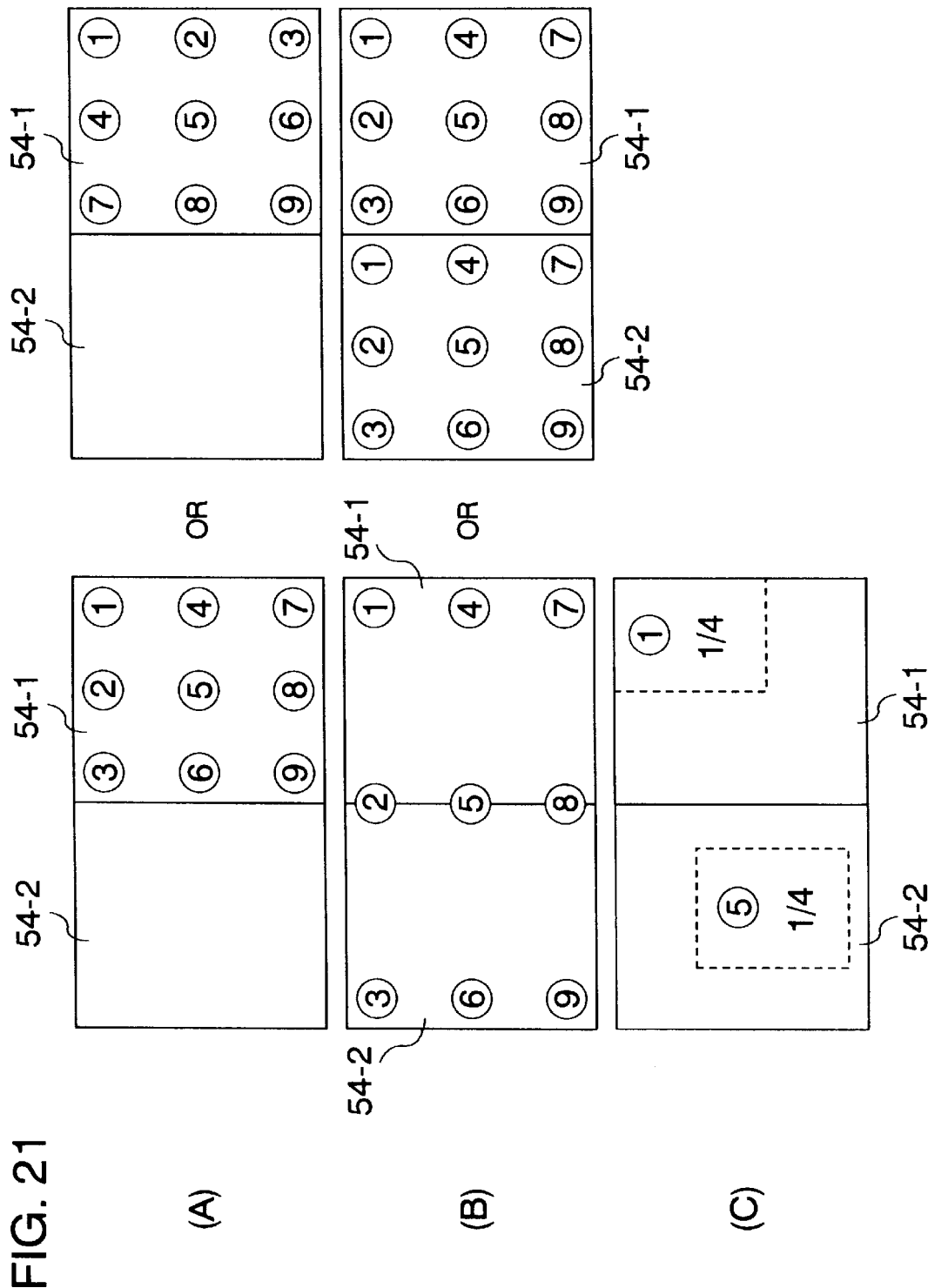

EDIT PROCESS FLOW

FIG.30
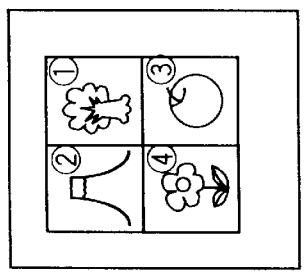
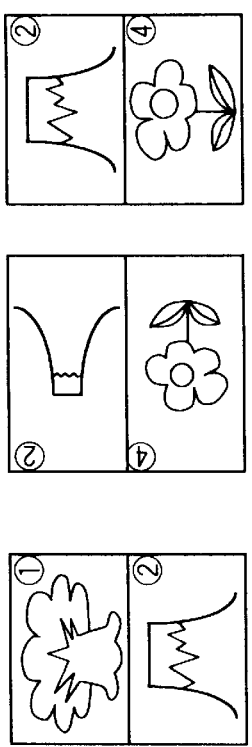
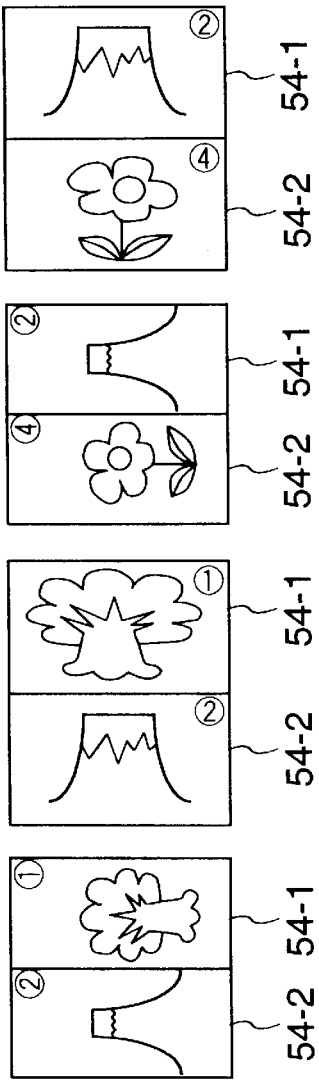

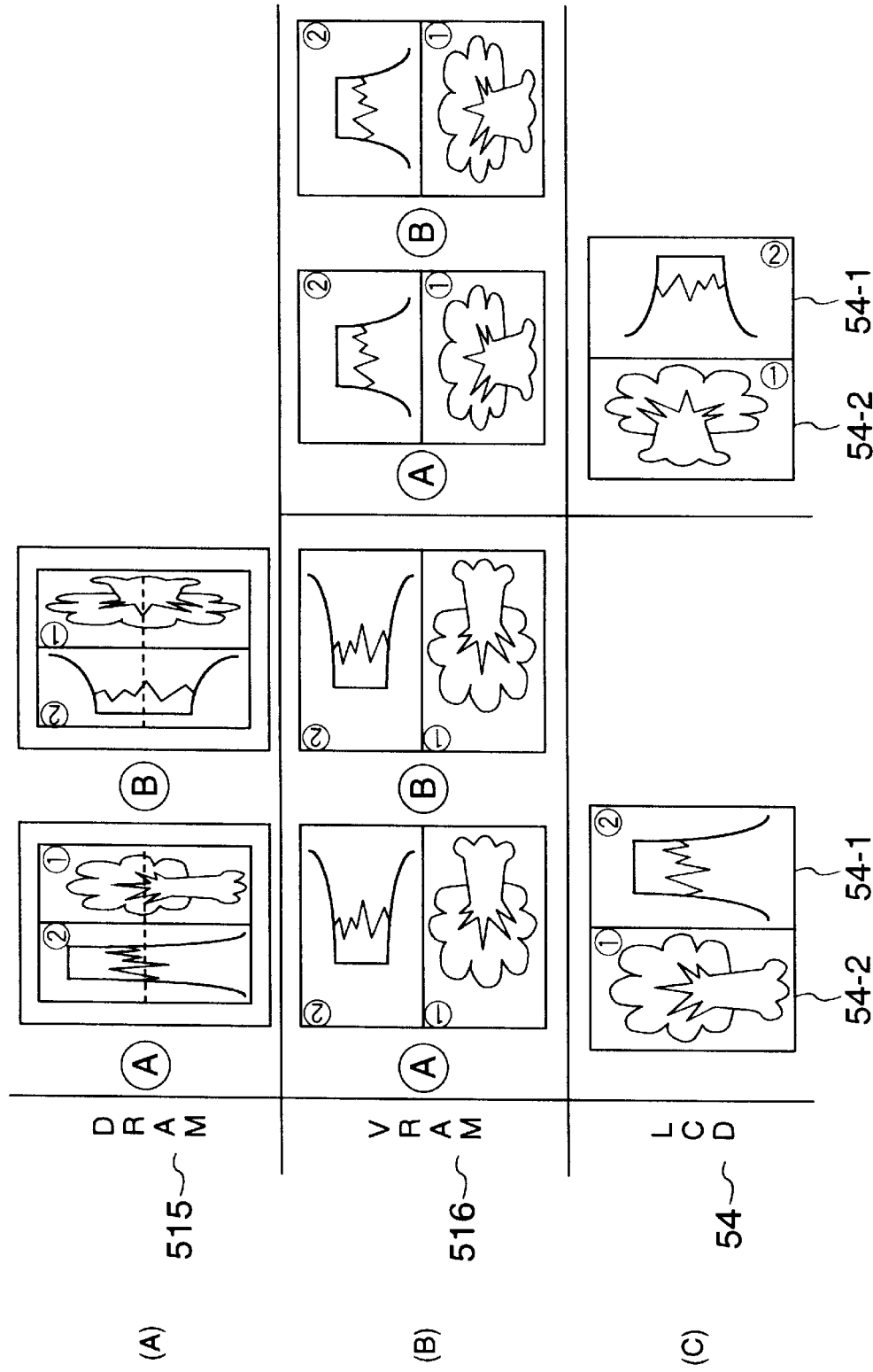

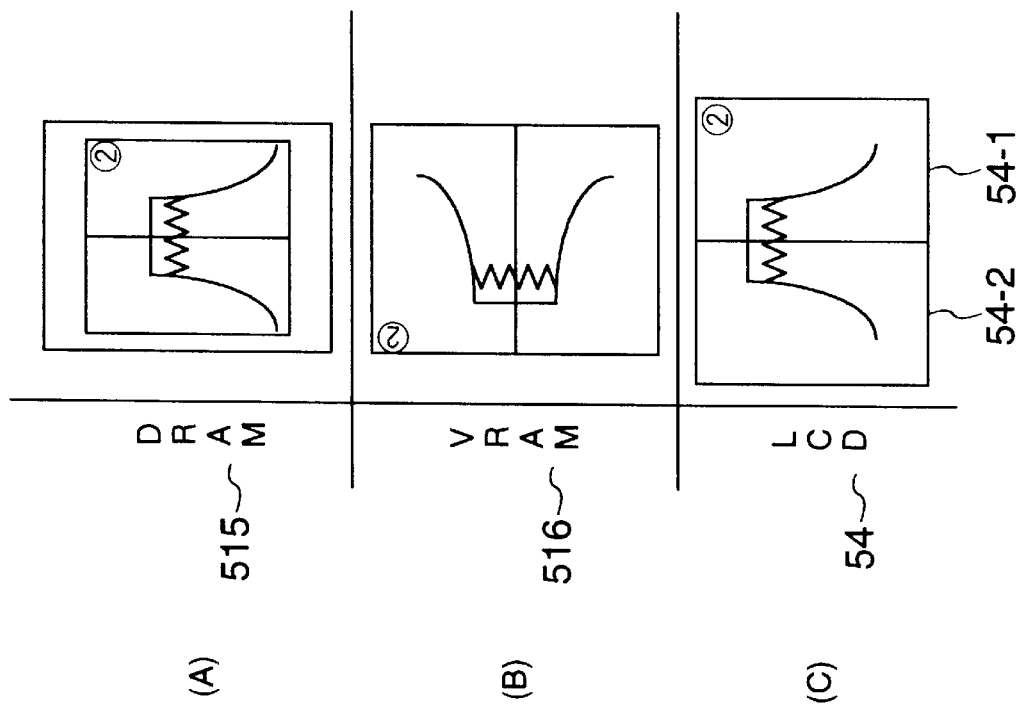

PAGE UPDATING PROCESS FLOW

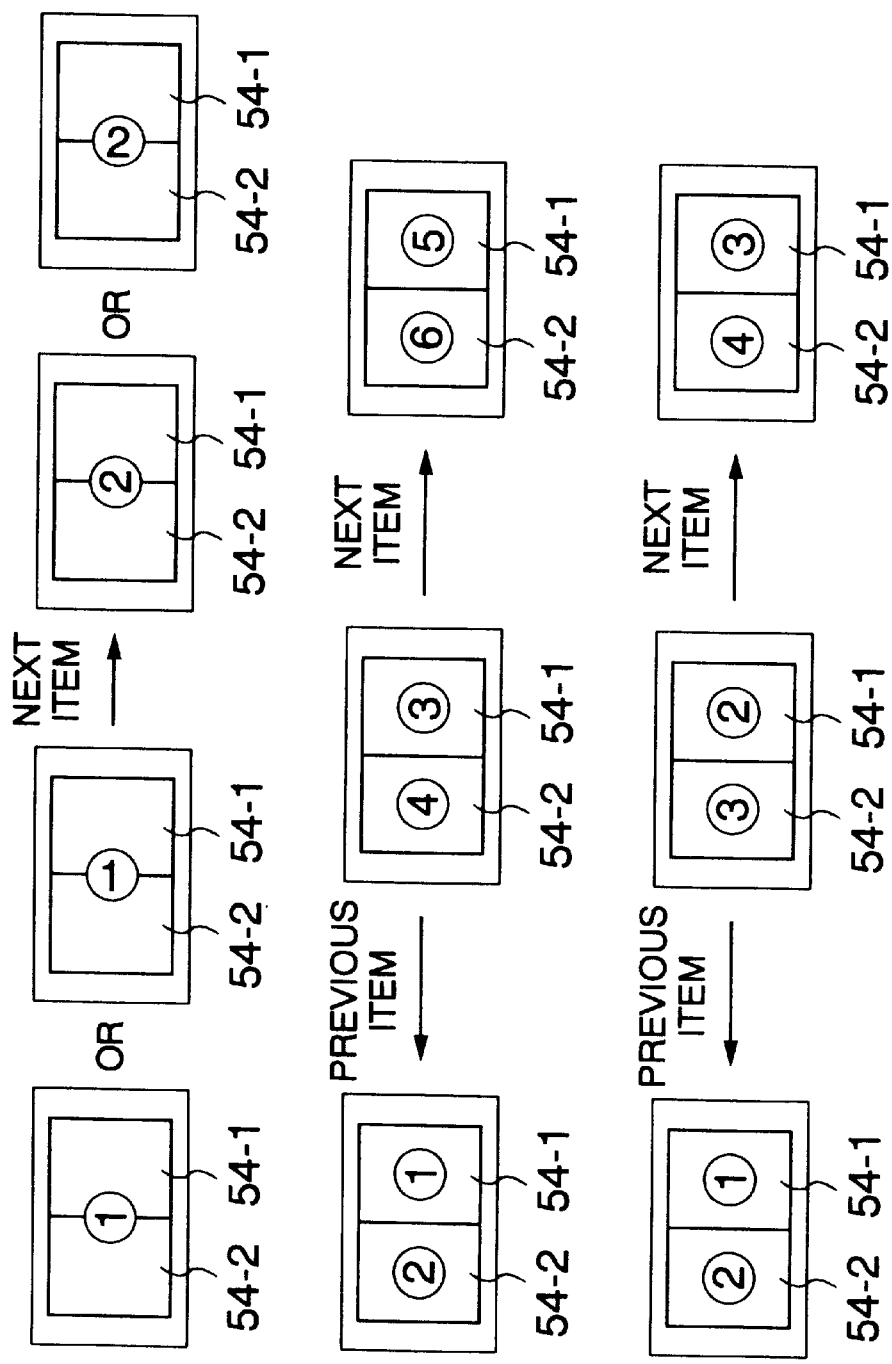

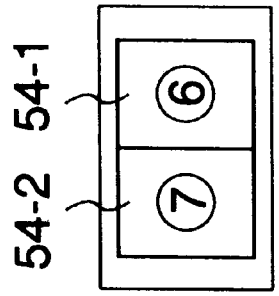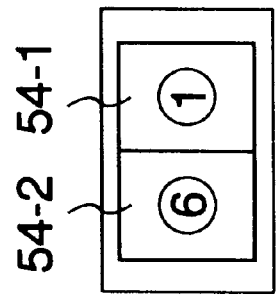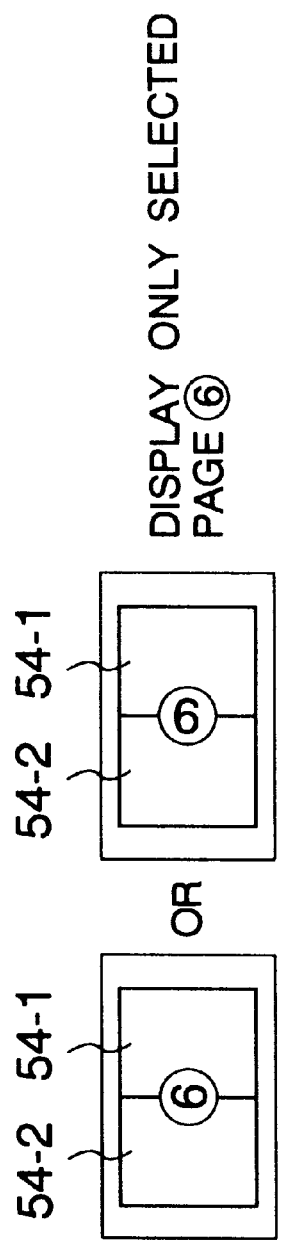
FIG. 36A  SELECT TWO PAGES AS SET
FIG. 36B  DISPLAY SELECTED PAGE ON ONE SCREEN WHILE KEEPING OTHER SCREEN AS IT IS
FIG. 36C  DISPLAY ONLY SELECTED PAGE ⑥

APPARATUS AND METHOD FOR DISPLAYING IMAGES

BACKGROUND OF THE INVENTION

The present invention relates to a portable image display device for printed materials such as books, and more particularly to image display device and method having an open display function like a book as well as portability and suitable for displaying electronic sheet information.

An electronic apparatus for displaying electronic sheet information such as text or graphics on a liquid crystal display (LCD) device has been proposed. When the electronic sheet information is to be displayed on the liquid crystal display device, a currently available liquid crystal display device does not fully accomplish a role of books due to problems of resolution and portability thereof. This is because a limit in the present days LCD technology. However, in order to realize an image display device using the existing display system, it is most preferable to use the LCD which is superior to a CRT in the portability and the compactness.

A portable electronic apparatus which has two left and right open display screens which can be opened and closed in the same sense as a notebook and arranged closely to each other during the use has been proposed as an electronic apparatus having a book type display as disclosed in JP-A-3-217959, JP-A-4-355786 and JP-A-6-183389.

However, those prior art apparatus only suggest a so-called dual-screen independent display mode in which the dual open display screens are independently used and does not pay attention to a dual-screen integral mode and a display function such as magnification or edition.

In general, a print medium like a book has a resolution to permit recognition of a very fine character, and when book information such as cartoon is to be presented in the form of image, a resolution equivalent to 24 dots square per character which is a standard in the existing printers is required. When represented at 24 dots squares per character and assuming that each character has a size of 3 mm square, the resolution is approximately 8 dots/mm=approximately 203 dpi (dots/inch) to meet the requirement to display the book information. However, when the LCD is used as the display device to take place of the book, it is not sufficient compared to the media like books in terms of easiness to view the display screen and the resolution. Further, with the current technology of the LCD, it is difficult to attain the required resolution in view of the manufacturing and packaging technologies. The books have various sizes such as BUNKO size, SHINSHO size, magazine size and newspaper size and they have an advantage of compactness and portability so that they may be read in commuter trains and are easy to carry.

SUMMARY OF THE INVENTION

In view of the above, it is an object of the present invention to provide image display device and method for a side-by-side screen book type display which does not loose information derived from printed medium of book and which also has portability which is a characteristic of the book.

It is another object of the present invention to provide image display device and method which has a dual-screen independent mode and a dual-screen integral display mode and which can select one of those modes.

It is other object of the present invention to provide image display device and method which permits a user the magnification and edition of the display.

In order to achieve the above objects, there is provided an image display device comprising a record medium mount unit and a record medium driver unit for mounting a record medium having column image information recorded thereon as electronized compressed image data, a display unit including first and second display screens, an electronic circuit unit for reading a predetermined amount of record data from the record medium mounted on said record medium mount unit and supplying to said display unit, a console unit for determining a display mode to said display unit of the read data, and a portable and foldable book type main body for accommodating said units. The first and second display screens of said display unit are combined as dual-screen independent display screen and/or dual-screen integral display. Said record medium mount unit and said record medium driver unit are arranged in one of left and right sides of said book type main body and an electronic circuit board containing said electronic circuit unit being arranged on the other side. One of said display screens being arranged above said record medium mount unit and said record medium driver unit and the other display screen is arranged above said electronic circuit board. In the use mode, said book type main body being spread to permit viewing of the first and second display screens of said display unit and in the non-use mode, said book type main body is folded to fold the display screens over each other to facilitate the carrying.

There is also provided an image display device for mounting a record medium having column image information recorded thereon as electronized compressed image data and displaying the image data of said record medium in accordance with an operation mode of a console unit on a display unit including first and second display screens, comprising a circuit unit for decompressing a predetermined amount of data read from the record medium mounted on said record medium mount unit, a first memory circuit unit for holding the display image data decompressed pressed by said circuit unit, a second memory circuit unit for temporarily storing the data of said first memory circuit unit directly or after thinning by a predetermined amount to fit to a display mode, a display controller unit for supplying the data of said second memory unit to one or both of the first and second display screens of said display unit, in accordance with the display mode by said console unit, and a processor including the console unit for specifying the display mode of the data to the first and second display screens and a control unit associated with said respective units for conducting a dual-screen independent display control and dual-screen integral display control in accordance with the display mode. The image data of said record medium is displayed on the display screens of said display unit at a recognizable resolution in accordance with the display mode of said console unit and in any one of one-page two-screens display mode, one-page one-screen display mode and two-pages two-screens display mode.

There is also provided an image display method for mounting a record medium having column image information recorded thereon as electronized compressed image data, storing the image data of the record medium in a memory unit and displaying the data stored in the memory unit on a display unit including first and second display screens, comprising the steps of staring the first and second display screens of said display unit upon power-on and supplying and displaying the data of said memory unit on the display screens, supplying data A and B of different contents in the memory unit to the display screens for displaying on the two display screens independently and in portrait when a dual-screen independent display mode is set for the display unit by said console unit, supplying one of data A and B of the same content in said memory unit to the display screens for displaying the supplied data in the landscape when a dual-screen integral display mode to display on the display screens of said display unit as one screen is set, extinguishing the data display o:n the off display screen and displaying the data supplied to the other on display screen in portrait when the start of one of the first and second display screens of said display unit is turned off by said console unit, and changing the respective displays between the portrait and the landscape by said console unit.

In accordance with the image display device of the present invention, because of the provision of dual wide display screen LCDs, the display area and the resolution of the LCD are compensated.

Further, by using the dual LCD image screens as dual independent screens or one continuous image screen, the information of not only a small size book such as BUNKO size or SHINSHO size but also the information of A2-size like a newspaper can be displayed.

Still further, the display screen is spreadable like a book so that it is folded when it is carried and opened like the book when it is used. Accordingly, it is suitable for carrying.

Accordingly, the image display device of the present invention can be used as an image display device which takes place of a book without a sense of different medium, can display several books of electronic media information and provide the same compactness and portability as the book.

In accordance with the image display device of the present invention, dual wide display screen LCDs are used and only one LCD display screen may be used in magnification mode and the non-magnified display data may be displayed in the other display screen, or the display data which is displayed in one LCD display screen may be displayed in the dual LCD display screens to magnify the data so that the user can view the data which would normally be hard to view with the resolution of the LCD in a desired display style by the utilization of the display screens or the magnify/reduce function. Thus, a large volume of data such as magazine data may be displayed while compensating the resolution of the LCD.

Accordingly, the image display device of the present invention can be used as an image display device which can take place of a book without a sense of different medium and provide the same display functions as the book has.

In accordance with the image display device of the present invention, because of the provision of the dual wide screen LCDs, the display may be made in accordance with the spread pages of the book, and the image may be displayed in various styles on the LCD display screens such as portrait display or landscape display, or one-screen independent display or dual-screen integral display. Thus, the display may be made in accordance with the display data and the user may read the data in the desired display style and a large volume of data such as magazine may be displayed while compensating the resolution of the LCD.

Accordingly, the image display device of the present invention can be used as the image display device which takes place of the book without a sense of different medium, can display several books of electronic media information and provide the same display functions as the book has.

BRIEF DESCRIPTION OF THE DRAWINGS

FIGS. 20A–20D show magnification/reduction functions of the image display device of the present invention, FIG. 21 shows display of a magnification/reduction reference image of the image display device of the present invention.

FIG. 30 shows display of image control of the image display device of the present invention.

FIG. 31 shows display of image control of the image display device of the present invention.

FIG. 32 shows display of image control of the image display device of the present invention.

FIGS. 35A~35C show page updating of the image display device of the present invention, and FIGS. 36A~36C show page selection (selection of page 6) of the image display device of the present invention.

DESCRIPTION OF THE PREFERRED EMBODIMENTS

The embodiments of the image display device and method of the present invention are now explained with the drawings.

A book type display of the pre(sent invention is explained.

[System Overview]

An electronic column information distribution system is first explained.

The electronic column information distribution system is a system including information generation/distribution and consumption in which column information is converted to electronic information to take place of the utilization of printed material by conventional papers (column information of newspaper and magazines) and distributed to and soled by automatic vending machines installed at stations and consumers purchase the electronic column information by recording it to electronic media such as IC cards or magneto-optical disks and display it on portable terminals such as portable displays.

By the electronic sheet information distribution system, the information in the form of "electronic media" to take place of papers are provided to the consumers. By the use of the book type display as the display terminal, the population of the present system is enhanced and a creation of a new large scale market is expected. When the present system is used at home or by individuals and becomes as a medium to take place of papers, the population will be accelerated, the market will be further developed and a large market of "one terminal for each person" for the portable terminals will be possible. Further, as the automatic vending machines are populated, the electronic column information can be easily purchased at shops at stations or on streets and required information will available anywhere. The information contained is not limited to the newspaper but also any text information such as books and magazines.

Figure 1:
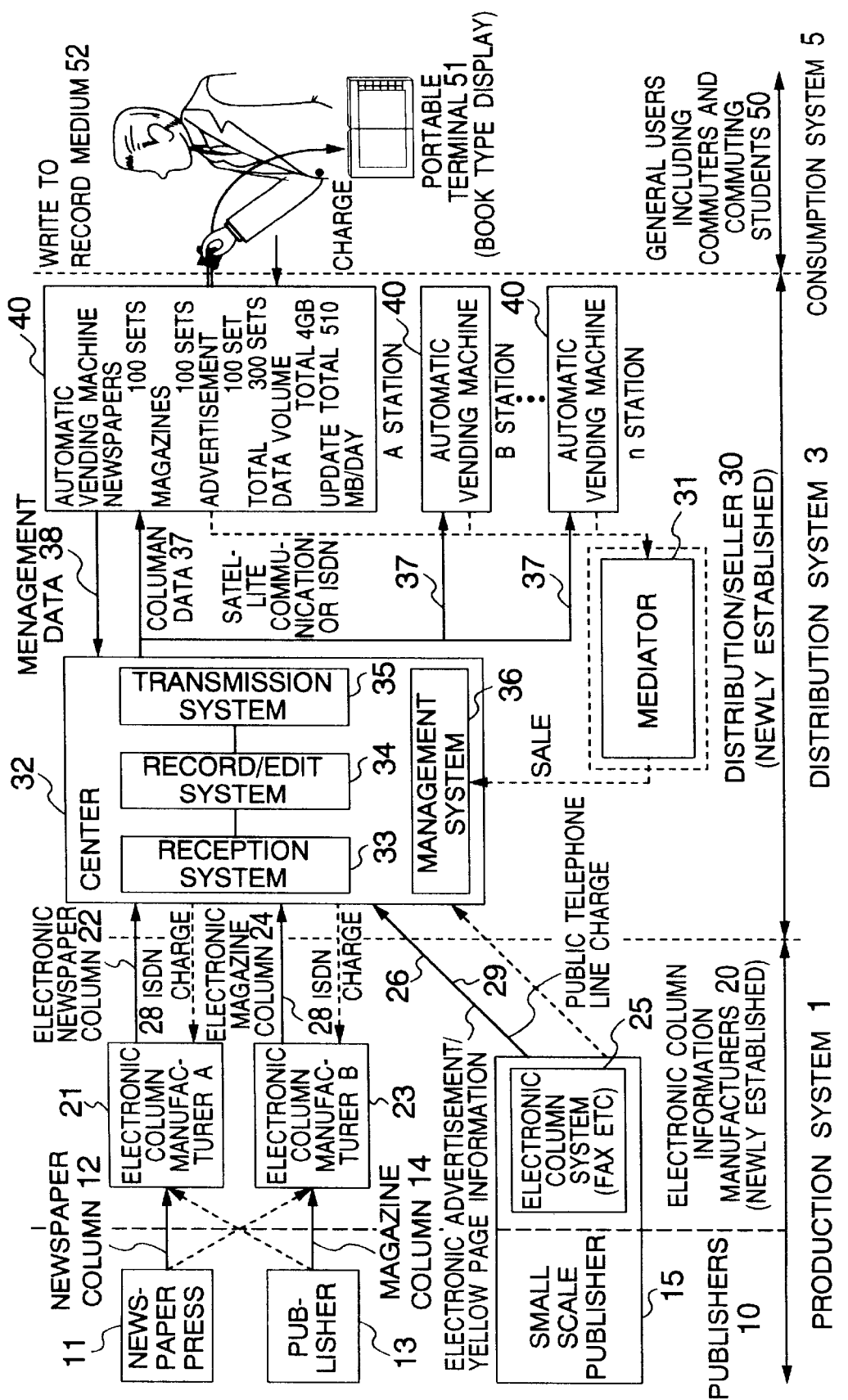
FIG. 1 shows a diagram of an electronic information distribution system which is a background of the present invention, FIGS. 2A and 2B appearances of the image display device of the present invention.

Referring to FIG. 1, an overview of the system configuration is explained. The present system comprises three sub-systems, a generation system 1, a distribution system 3 and a consumption system 5. The generation system 1 comprises publishers 10 and electronic column information manufacturers 20, and the publishers 10 comprises newspaper presses 11, publishers 13 and small scale publishers 15.

In the small scale publishers 15, the publishers 10 and the electronic column information manufacturers 20 are not discriminated hut the small scale publishers 15 themselves include electronic column systems 25 which function in the same manner as the electronic column information manufacturers 20.

The distribution system 3 comprises electronic column information distributors/sellers 21 and mediators 30. The electronic column information distributors/sellers 30 comprise a center 32 and automatic vending machines 40. The center 32 comprises a receiving system 33, a record/edit system 34, a transmission system 35 and a management system 36.

The consumption system 3 comprises general consumers 50 such as commuters and commuting students and their portable terminals 51.

The newspaper presses 11 provide newspaper column information 12 and the publishers 13 provide magazine column information 14. The small scale publishers 15 provide electronic advertisement/yellow page information 26.

The electronic column manufacturers 21 and 23 and the center 32 may be connected via an ISDN line 28 and the small scale publishers 15 and the center 32 may be connected via a public telephone line 29.

In the present system, the electronic column information manufacturer 20 first converts the columns to the electronic newspaper columns 22 and electronic magazine columns 24 as the electronic column information of a predetermined format of the present system. The small scale publisher 15 also converts the columns to the electronic advertisement and yellow page information 26 by the electronic column system 25 included therein. They are distributed from the center 32 to the automatic vending machines 40 and sold. Data amount to be handled is now is considered.

[Analysis of Display Data]

The information of the newspapers and magazines as an example of column data to be handled comprises two major classes, "text" information such as heading, main column and advertisement, and "graphic" information such as photograph and chart. However, by handling the column information as graphic data, the entire information may be represented as an image. Thus, the data may be handled in the same manner as that in an image scanner or a facsimile machine. The data amount when the column information is handled as the image is shown in Table 1.

TABLE 1

| Column Information in Image | | | |
|---|---|---|---|
| Sheet Size | Resolution | Number of Dots of Horizontal × Vertical | Information Amount (M Bytes) |
| A4 | 400 | 3,232 × 4,736 | 1.9 |
| A2 | 200 | 3,232 × 4,736 | 1.9 |
| A4 | 200 | 1,616 × 2,368 | 0.5 |

In order to represent information of cartoon included in a book in image, it should be represented not to damage only fine image information but also text information such as balloon. However, in order to represent characters of the balloon, a resolution per character which is equivalent to 24 dots square of a standard printer is requited. When it is represented by 24 dots square per character and assuming that a size of each character is 3 mm square, the resolution is approximately 8 dots/mm=approximately 203 dpi (dots/inch) which is a level not satisfied by the image information. The display data amount to meet this level of resolution is very large and it is horizontal 1,616 dots×vertical 2,368 dots (approximately 0.5 MB) of data for one page of A4-size sheet.

[Requirements to Display Device]

The following two points are requirements to the display device.

(1) Resolution

In order to display column information such as newspaper or cartoon, a resolution of at least 200 dpi for the A4-size is required as described above. Since the book type display is supposed to be a display device to take place of the book in future, the display of one page of sheet on both sides as it is when a reader reads a book permits the display of largest volume of contents and permits the user to view the display without a sense of different medium. Further, when a subscript for a Kanji character is to be recognized, a resolution of 300 dpi to 400 dpi at maximum is required.

It is also necessary to display margin text information in a margin space which is frequently seen in a magazine. In order to read such fine information, a human eye repeats magnification and reduction unconsciously. It is necessary to add a function to simulate such human operation to the display device to convey the column information to the reader.

In order to convey the column information to the reader by the display device, an ability to display at the resolution corresponding to one page of sheet described above is necessary, and even if the entire page is not displayed, an ability to magnify a desired portion of the image or raise the pseudo-resolution is required because, when a human reads a newspaper, he may instantly and randomly repeat to look the entire sheet to read only headings and read one article in a very small space. Thus, it is necessary to be able to read a column of at least monochromatic binary dot data with magnification/reduction, scrolling and page selection. Assuming the display of cartoon as an example to discuss the resolution of 640×480 dots LCD, it can recognize the "graphics" but it is difficult to read the words of the balloon. In order to read the words of the balloon, the structuring at the center system to edit the text information of the graphic information of the cartoon after it has been read by replacing it with characters which are easy to read even with the low resolution (for example, characters normalized by approximately 1.2 dots square per character) is required. The text may be recognized by such edit operation but if this operation is always performed for display, the amount of work on the side of manufacturing the electronic column information is increased.

(2) Portability

As the next requirement, it is necessary to provide the portability and easiness of the newspaper and magazine to the display device. In general, in the books, the "easiness to read anywhere" is a natural requirement and it is necessary to solve the natural property by reducing the size and weight of the display device. It is necessary for the replacement of the book to meet that it can be always carried anywhere, may be used even in a narrow space and the user does not feel the weight during the use.

As the manner to obtain the data (electronic column information), it is necessary that one issue of newspaper or magazine information is available by a record medium (IC card memory or the like) at shops at stations or on streets such as automatic electronic column information vending machines which sell the data and the data may be recorded on a magneto-optical disk which is a non-volatile bulk record medium. It is also necessary that the IC card memory is non-volatile for one day or longer (assuming that the data is recorded to the magneto-optical disk during that period) by attaching a battery thereto. It is also necessary that the information recorded in the magneto-optical disk may be selected and reproduced by issue and a selection and display function therefor is also required. This function may be an index function by which first pages of recorded newspapers and magazines appear sequentially by depressing a button. Several tens issues of newspapers or magazines of information may be recorded on one magneto-optical disk. However, when the capacity is full, no more information can be recorded. Therefore, an erase function to retrieve a newspaper or magazine issue by the index function and erase that issue by depressing a button is also necessary The erase button should be arrange so that it is not inadvertently depressed.

The present embodiment relates to a book type display based on the above requirements (1) and (2).

[Appearance and Basic Configuration]

Figure 2A:
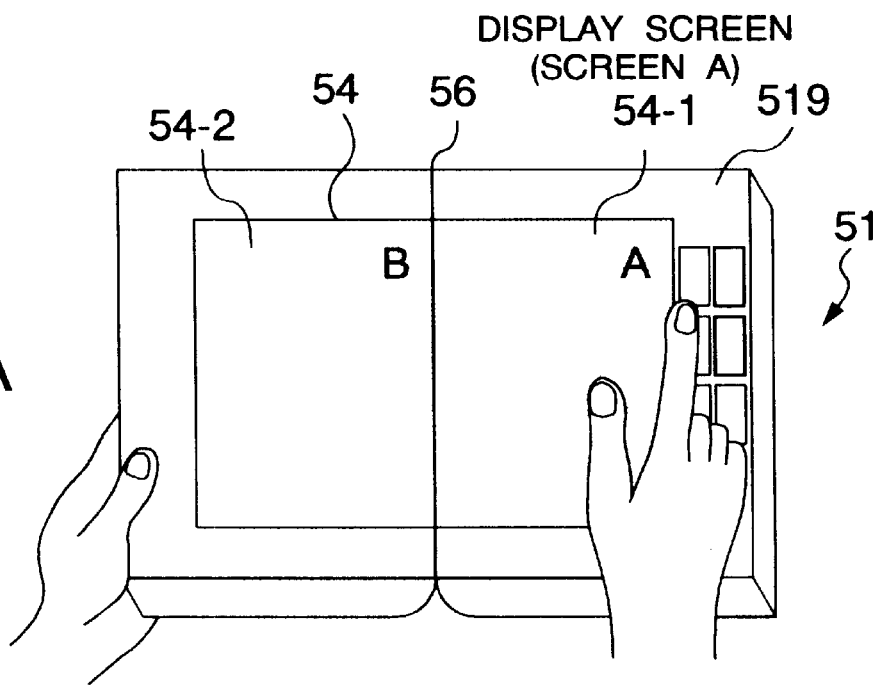
Figure 2B:
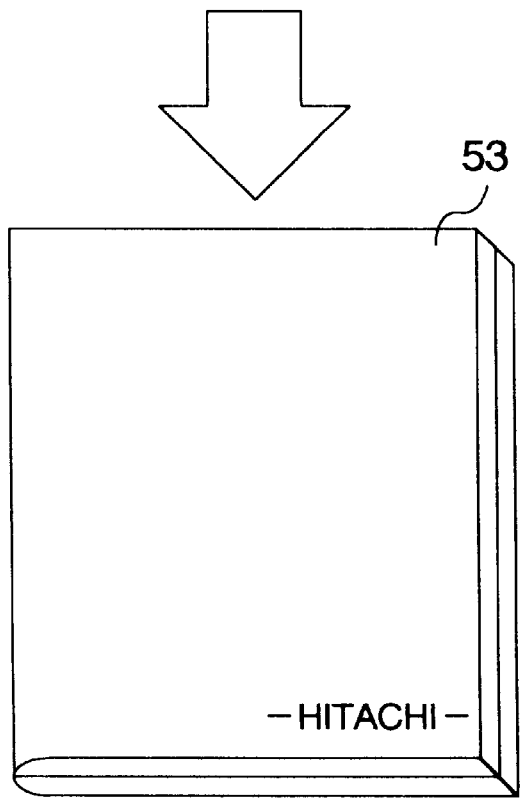

Appearances of the book type display 51 are shown in FIGS. 2A and 2B. As optional units, a charger, a magneto-optical disk driver (including a cable and a magneto-optical disk) and a dry cell box are included.

Figure 3C:
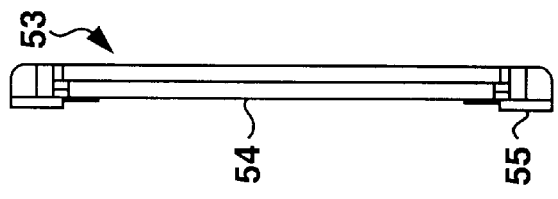
FIG. 3 shows a general view an embodiment of the image display device of the present invention.
Figure 3A:
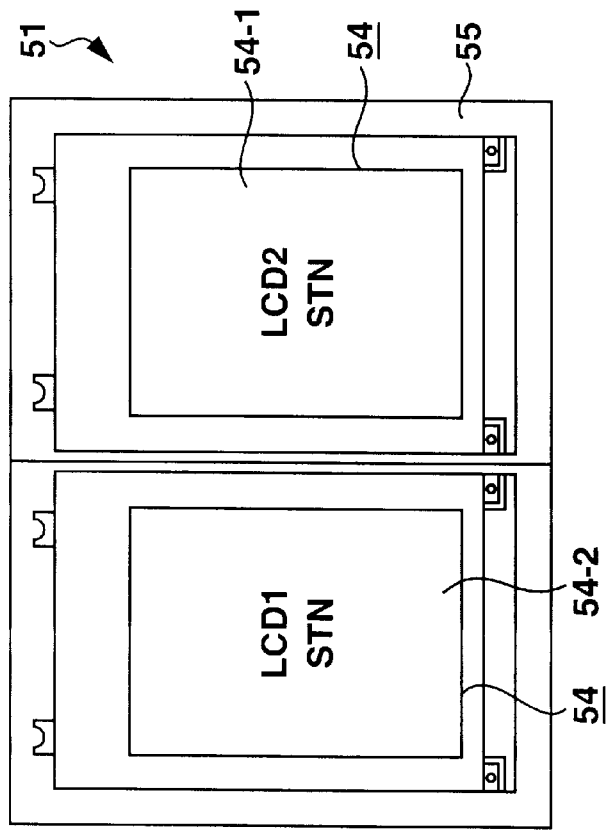
Figure 3B:
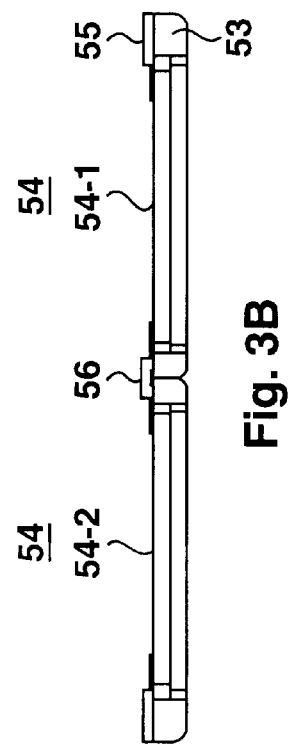
Figure 4C:
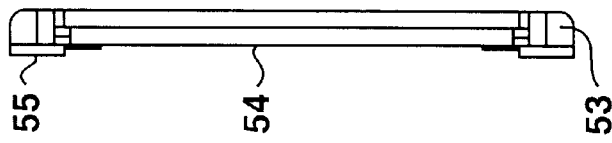
FIG. 4 shows a general view of an embodiment of the image display device of the present invention.
Figure 4A:
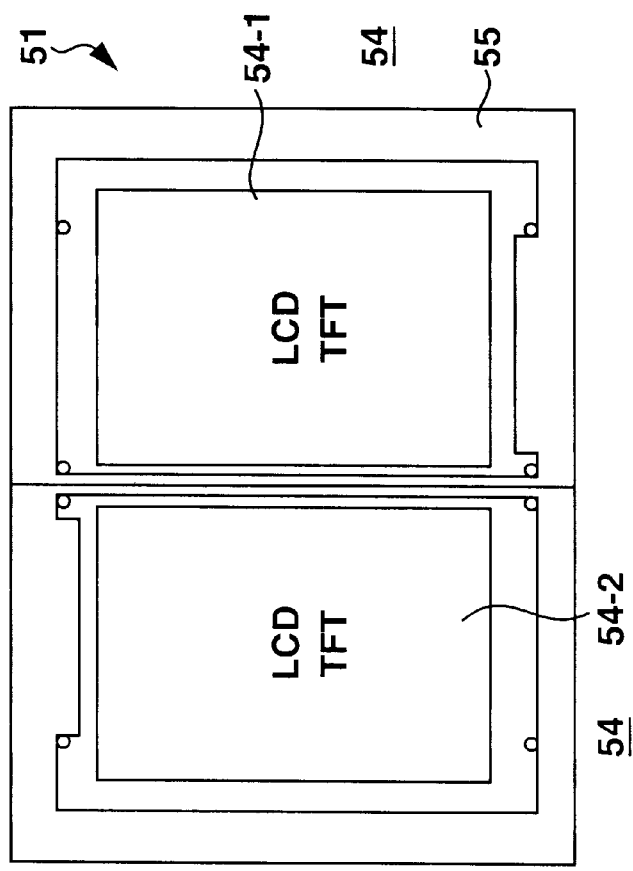
Figure 4B:
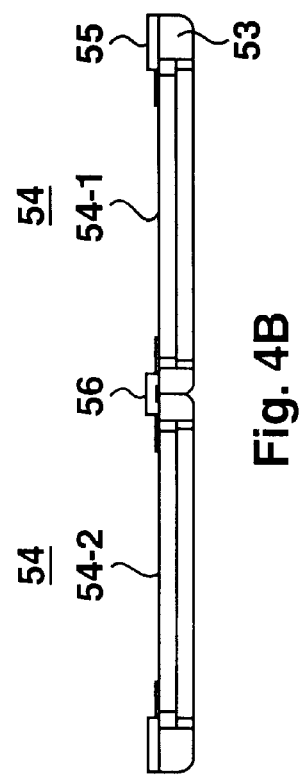

Since the present apparatus is assumed as a display terminal to take place of a book, the appearance is of the same specification as that of the book and opened display screens are on both sides and comprises dual LCDs (liquid crystal displays) 54. The image display device 54 assumes different shapes between the use time and the carry time, and during the use, the LCDs 54 are arranged on the left and right to provide an open series screen monitor in the same manner as that when the book is read. In the carry mode, the open display in the use mode is folded along a center so that it is carried with one-half size of that in the use mode. FIG. 3 shows a schematic three-side view of the book type display which uses the STN reflection type LCDs. FIG. 4 shows a three-side view of another embodiment which uses TFT LCDs 54 which can be arranged closely to each other.

The dual LCDs 54 are designated as LCD1 and LCD2, respectively. The left and right display areas are same. A console panel is provided at a right top of a frame. Alternatively, console panels may be provided at left and right tops of the frame 55. A coupler (hinge) 56 is provided at a center of the frame 55 to fold the frame along the center as shown in FIG. 2B. It is carried in the folded state.

[Appearance and Basic Configuration]

FIGS. 2A and 2B show structures illustrating appearance of the book type display of one embodiment of the present invention. FIG. 2A shows an open position and FIG. 2B shows a closed position. In FIGS. 2A and 2B, numeral 53 denotes a main body case having a hinge 56 to permit folding or open/close operation and numeral 54 denotes an LCD mounted on the case 53. The LCD has display screen 54-1 and 54-2 of the LCD closely arranged as shown in FIG. 2A. Numeral 519 denotes a console panel arranged on a right side of a frame 55 of the main body case 53 and including console buttons to execute various console functions. The console panel may be provided at each of left and right top of the frame 55. The console panel will be described later. As options, a charger, a magneto-optical disk driver (including a cable and a magneto-optical disk) and a dry cell case are provided.

Since the present apparatus is assumed to take place of a book, the appearance is of t he same specification as that of the book. The display device 51 of the portable terminal has dual LCDs 54 and has different shapes between the use mode and the non-use mode (carry mode). Namely, in the use mode, as shown in FIG. 2A, the dual LCD display screens 54-1 and 54-2 are opened left and right in the same manner as that when the book is read, and in the non-use mode (carry mode), as shown in FIG. 2B, the dual LCD display screens 54-1 and 54-2 are folded on each other. The LCD 54 may be an STN reflection type LCD as shown in FIG. 3. The LCD 54 may also be a TFT type LCD as shown in FIG. 4. When the TFT type LCD is used, the LCDs may be arranged upside down and closely to each other as shown. In this case, the image processing by software is necessary so that the images on the dual LCD display screens appear as one continuous screen.

Specifically, when data is transferred to an image memory, the transfer data to the LCD which is arranged upside down is transferred upside down. This is a process for a fixed address and subsequent addresses on a memory map.

The dual LCDs 54 are designated as LCD1 (54-1) and LCD2 (54-2), respectively. The areas of the display screens 54-1 and 54-2 of the LCDs 54 are same. The console panel 519 is provided at the right top of the frame 55. The console panel may be provided at each of the left and right tops of the frame 55. A coupler comprising a hinge 56 is provided at the center of the frame 55 so that the frame may be folded along the center as shown in FIG. 2B.

Figure 5:
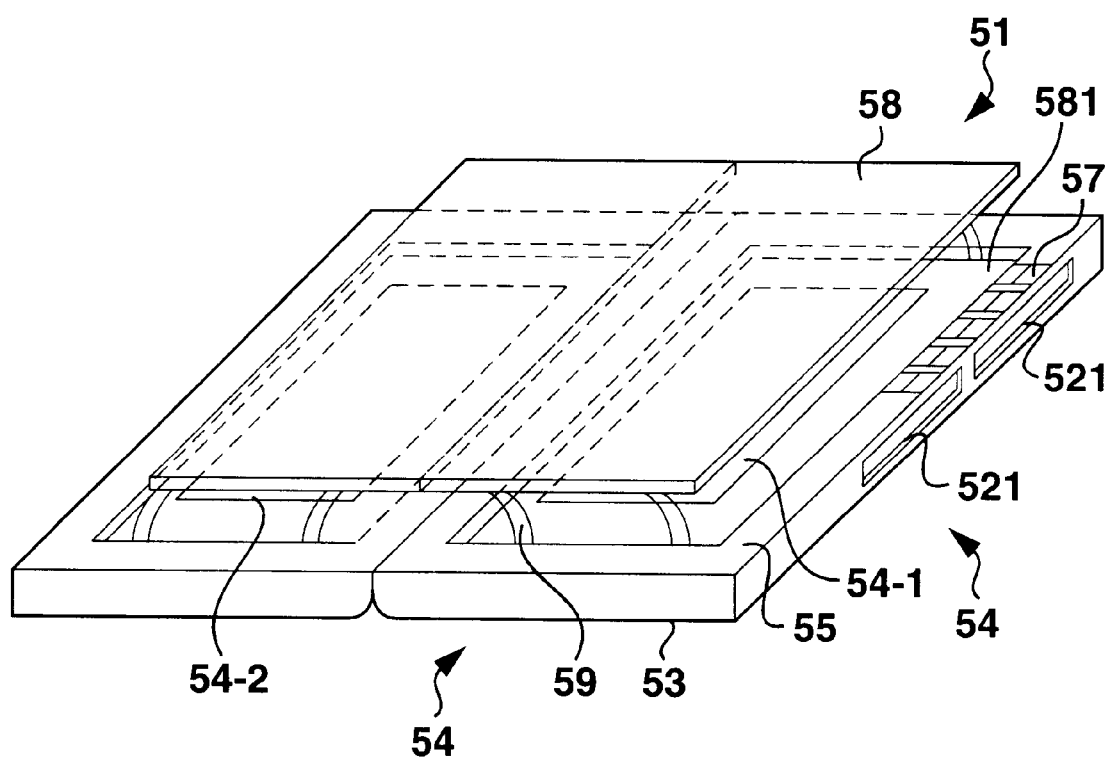
FIG. 5 shows a basic construction of the image display device of the present invention.
Figure 6A:
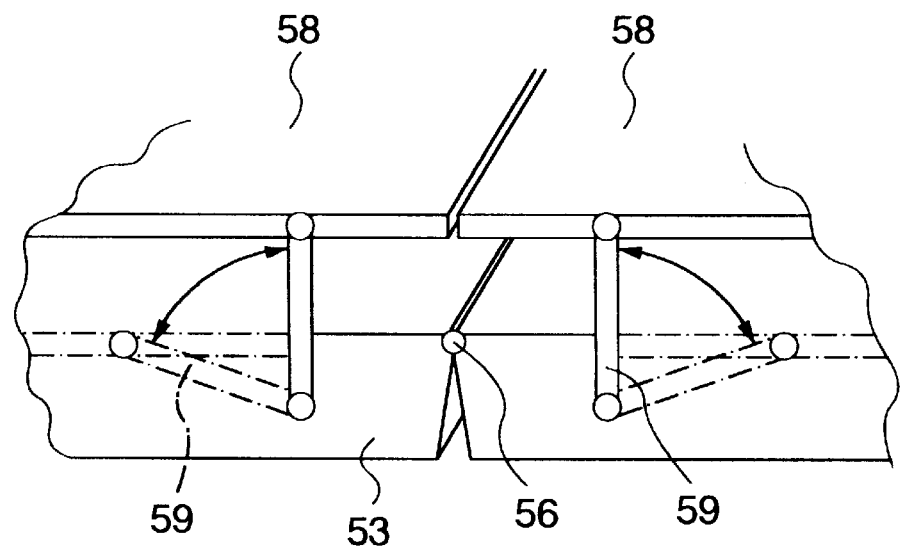
FIGS. 6A and 6B show mechanisms of a magnification lens of the image display device of the present invention.

Referring to FIG. 5, a specific embodiment of the display device 51 is explained. The display device 51 has dual LCDs (liquid crystal displays) 54 (54-1 and 54-2) having a resolution of 640×480 dots and has a display area which is not smaller than 80% of the entire area of the display device 51. The LCD 54 is of A5-size, and when dual LCDs are coupled, the display of A4-size is attained. In the present embodiment, the LCD 54 uses an STN reflection type liquid crystal. As shown in FIG. 6A, a magnification lens 58 is provided above each of the LCDs 54 and the lens is supported by a lens support (lens lift mechanism) 59. It is of the same size as or larger size than the magnification lens 58. When the display device 51 is in the open position, the magnification lens 58 is positioned a predetermined distance upward of the LCD 54, and when the device is folded, the magnification lens 58 contacts to the LCD 54 and mounted in a recess 581 so that the device surface is kept flat.

The purpose of the magnification lens 58 is to optically eliminate a frame area (in which no image is displayed) between the dual LCDs 54 so fill a gap between the LCD screens to create one continuous screen. To this end, the image display areas are magnified to bring the edges of the LCD display screens closely to each other.

When the device is opened, the magnification lens 58 (a Fresnel lens in the present embodiment) floats from the plane of the LCD 54 by a predetermined distance by the support member 59 and the inner edges of the left and right magnification lenses 58 abut against each other so that the gap between the lenses is eliminated.

Figure 6B:
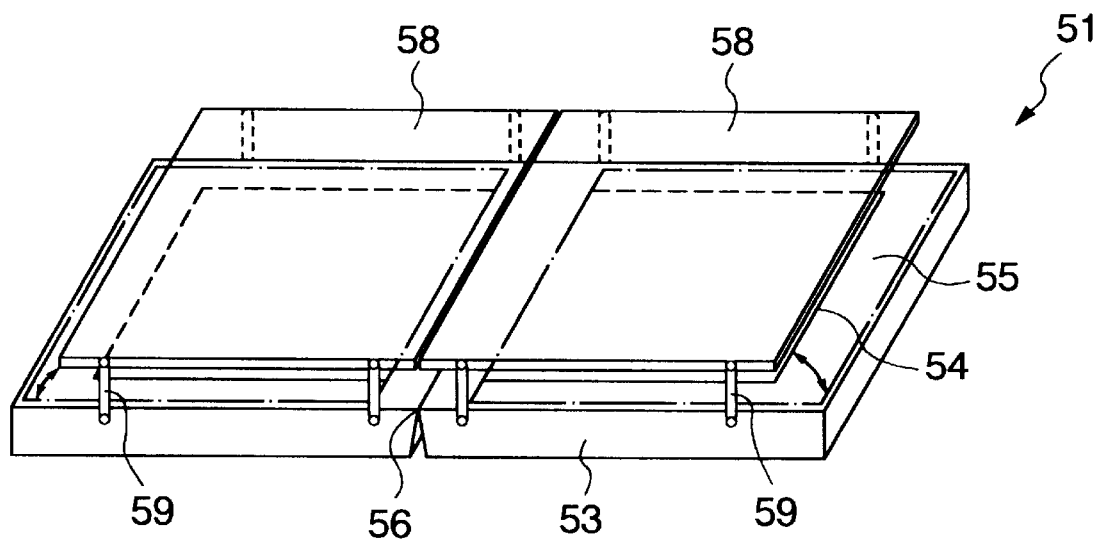

This mechanism is attained by the circumferential movement of the support member 59 to which the magnification lens 58 is mounted as shown in FIGS. 5, 6A and 6B. Thus, when the device is folded, the magnification lenses 58 contact to the respective planes of the LCDs 54. When the device is opened, the magnification lenses 58 are lifted up from the respective planes of the LCDs 54 and brought to each other by the circumferential movement of the support member 59 toward the coupler. This operation is performed manually. In this manner, the screen of the LCDs 54 may be independently viewed without the screen magnification while the two magnification lenses 58 are contacted to the respective planes of the dual LCDs 54. By providing a spring to the support member 59, the support member may be automatically moved circumferentially to lift up the magnification lenses when the device is opened.

Figure 7B:
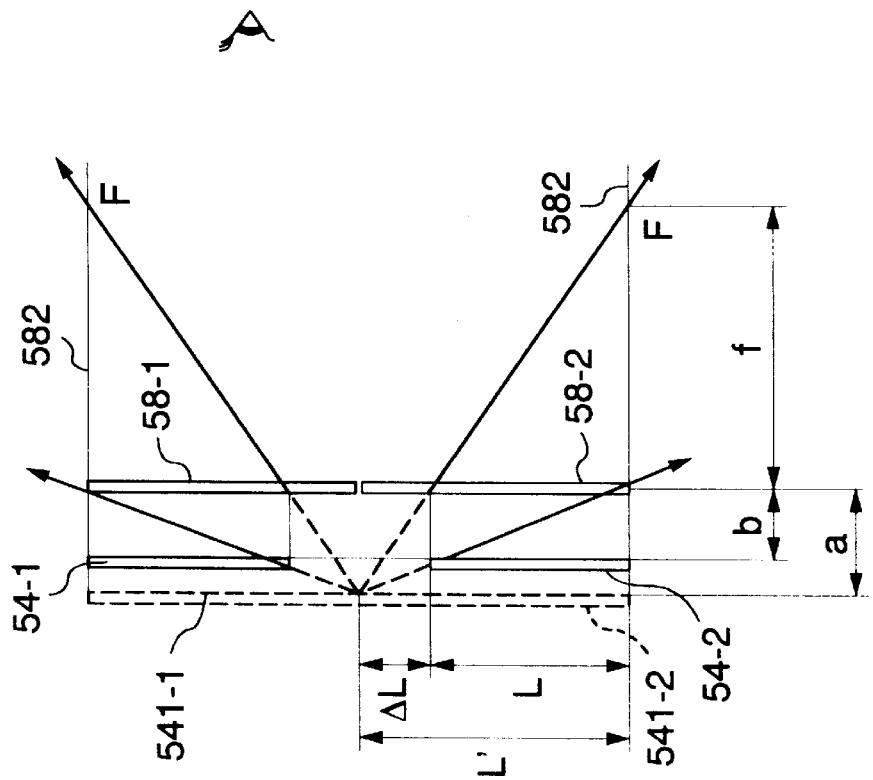
FIGS. 7A and 7B show relation formulas in the arrangement of the magnification lens of the image display device of the present invention.
Figure 7A:
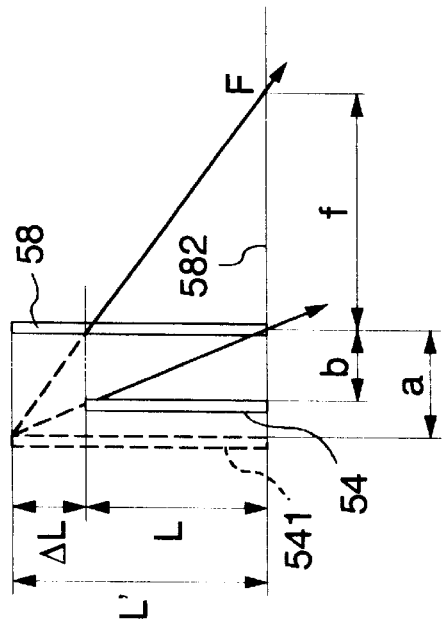

Referring to FIGS. 7A and 7B, the function of the magnification lenses 58 is further explained. As shown in FIG. 6A, the magnification lenses 58 are arranged such that optical axes 582 of the lenses are positioned at the center of the edges along the open direction of the display screens of the LCDs 54. FIG. 7A shows a relation between a distance b between the two magnification lenses 58 and the dual LCDs, and a focal distance f of the lenses, and FIG. 7B shows an optical chart of the arrangement.

Assuming that the distance between the LCD 54 and the magnification lens 58 is b, the distance between the magnification lens 58 and a virtual image 541 of the LCD is a and the focal distance of the magnification lens 58 is f, the relation thereof is given by the following formula (1):

$$(1/b)-(1/a)=1/f \quad (1)$$

Assuming that the length of the LCD 54 is L and the length of the virtual image 541 of the LCD 54 is L', the relation between the distances a and b and the lengths L and L' is given by the following formula (2):

$$L/L'=b/a \quad (2)$$

A combination of the focal distance f of the magnification lens 58 and the distance a between the magnification lens 58 and the LCD 54 is selected on the condition that the edges of the virtual images 54-1 and 54-2 of the left and right LCDs 54-1 and 54-2 contact to each other. Under this condition, the relation between L, L' and ΔL is given by the following formula (3):

$$\Delta L=L'-L \quad (3)$$

where ΔL is a distance between the coupler and the edge of the LCD (which is equal to one j¥half of the distance between the dual LCDs). Thus, the smaller the distance b is, the thinner the device may be but the smaller is the focal distance f. This means that a lens of a large aperture and a short focal distance is required, which imparts a limitation of aberration.

Accordingly, it is required that the magnification lens meets the relation of the following formula 84) between ΔL, L, b and f:

$$L/(L+\Delta L)=1-(b/f) \quad (4)$$

In this manner, the magnification of the screen is made only toward the coupler 5 of the device. An advantage of this method is that the magnification factor may be small and the distance between the LCD and the lens may be small.

Figure 8:
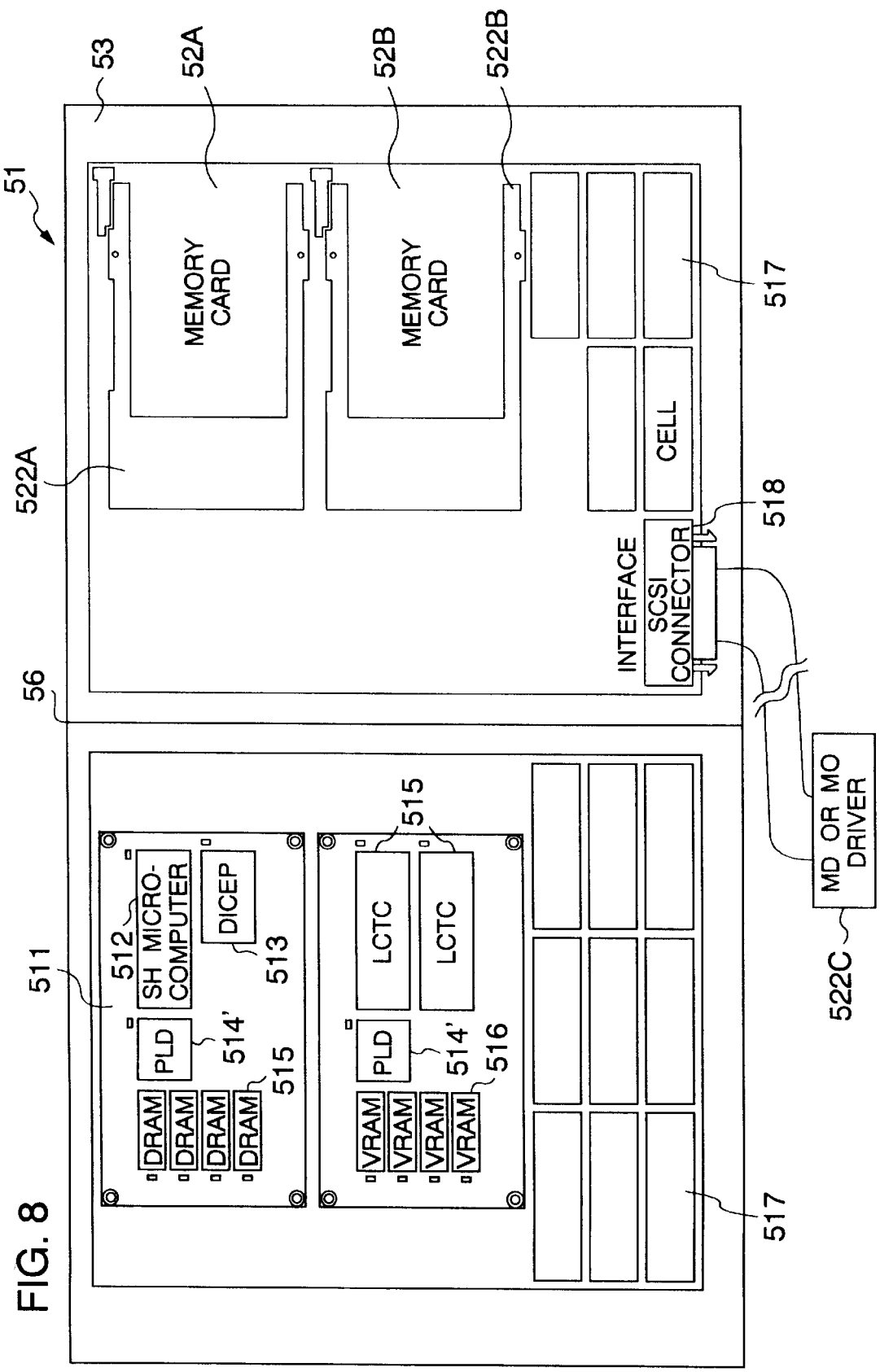
FIG. 8 shows a configuration of an electronic circuit of the image display device of the present invention.

Referring to FIG. 8, the construction of the device and the arrangements of the elements within the device are explained. The coupler 56 comprises the hinge through which wiring to the respective LCDs 54 pass. In the book type display, it is necessary from the standpoint of portability that all elements are arranged within the device 51. Accordingly, the arrangement of a power supply and a circuit board is determined. For the power supply, from the calculation of power consumption of the overall device, it is assumed that the present device is equipped with 14 1.2 volts cells 517. The number of cells 517 is evenly distributed to the left and right devices. The arrangement of the elements of the overall device is determined such that the vertical and lateral weight distributions are uniform when the device is opened. In the present embodiment, the cells 517, the electronic circuit board 511 and the record medium driver 522 (the memory card socket) are of high weight and the arrangement in the case is determined by taking those elements into consideration. A SCSI connector 518 as an interface to an external equipment is mounted on the device 51.

An SH microcomputer 512, a DICEP 513, a PLD 514, a DRAM 515 and a VRAM 516 which will be described later are mounted on the electronic circuit board 511. The size of the book type display device is determined by the size of the LCD 54 and it is necessary to make the size of other elements as small as possible so that the size of the monitor and the size of the entire device are larger by only the area of the console panel.

Since the thicknesses of the LCD and the cells cannot made thin as the nature of the elements, the thinness is attained by the arrangement of the electronic element. Of the electronic elements, the record medium socket for which the height is to be considered is arranged in either one of the dual left and right display devices and other elements area arranged in the other display device. The elements are arranged so that the height thereof does not exceed that of the record medium socket. For the elements which exceeds the height of the record medium socket, the shape of the circuit board is designed so that it is arranged at a space in which the LCD is not located. Further, since the height of the cells occupies a high percentage of the thickness of the device, the cells are arranged at a space where the circuit board is not located. In this manner, the present device may be made not larger than 20 mm.

The console panel is now explained.

[Console Panel Buttons]

Figure 9:
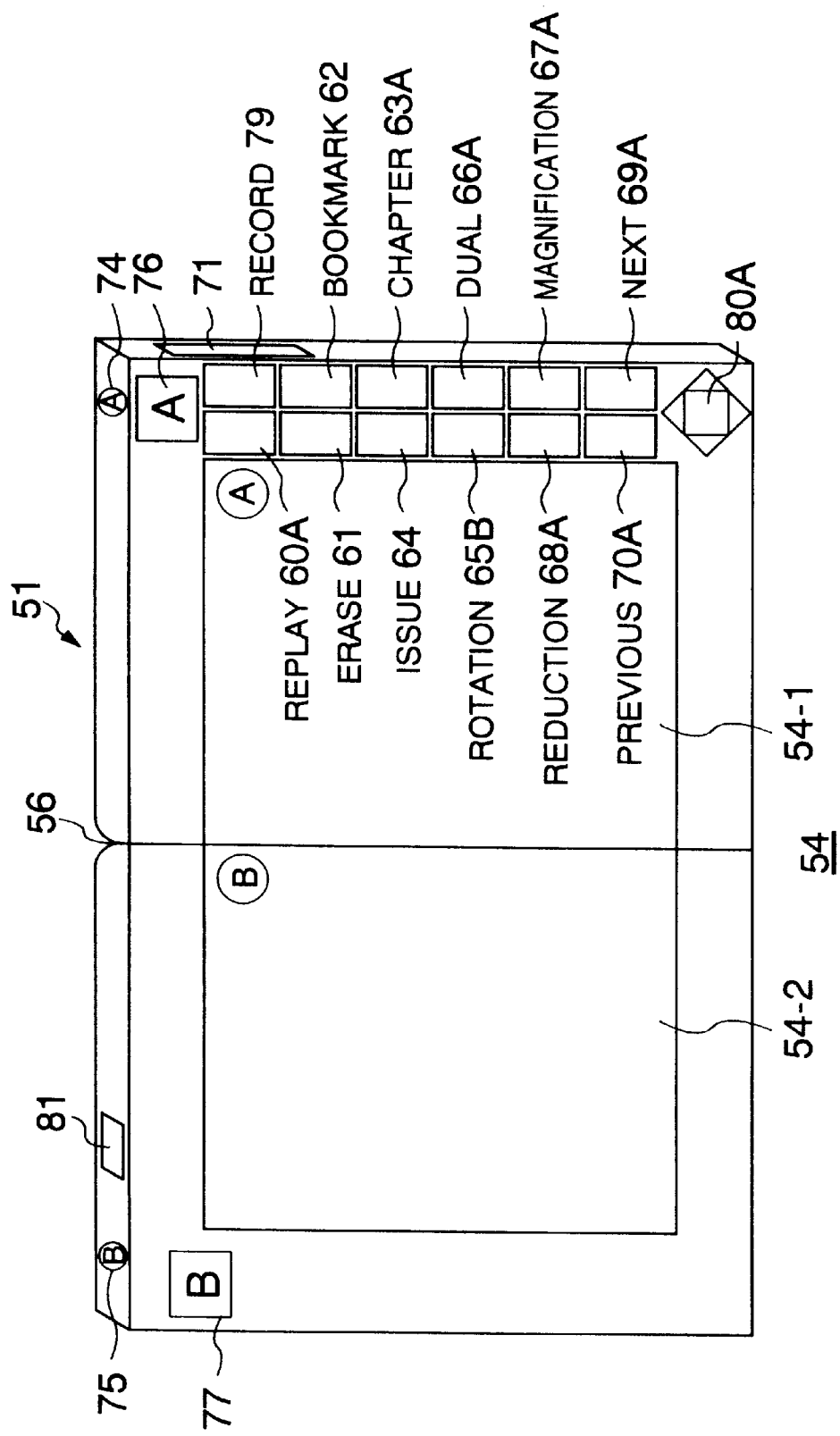
FIG. 9 shows an appearance of the image display device of the present invention and a console panel.
Figure 10:
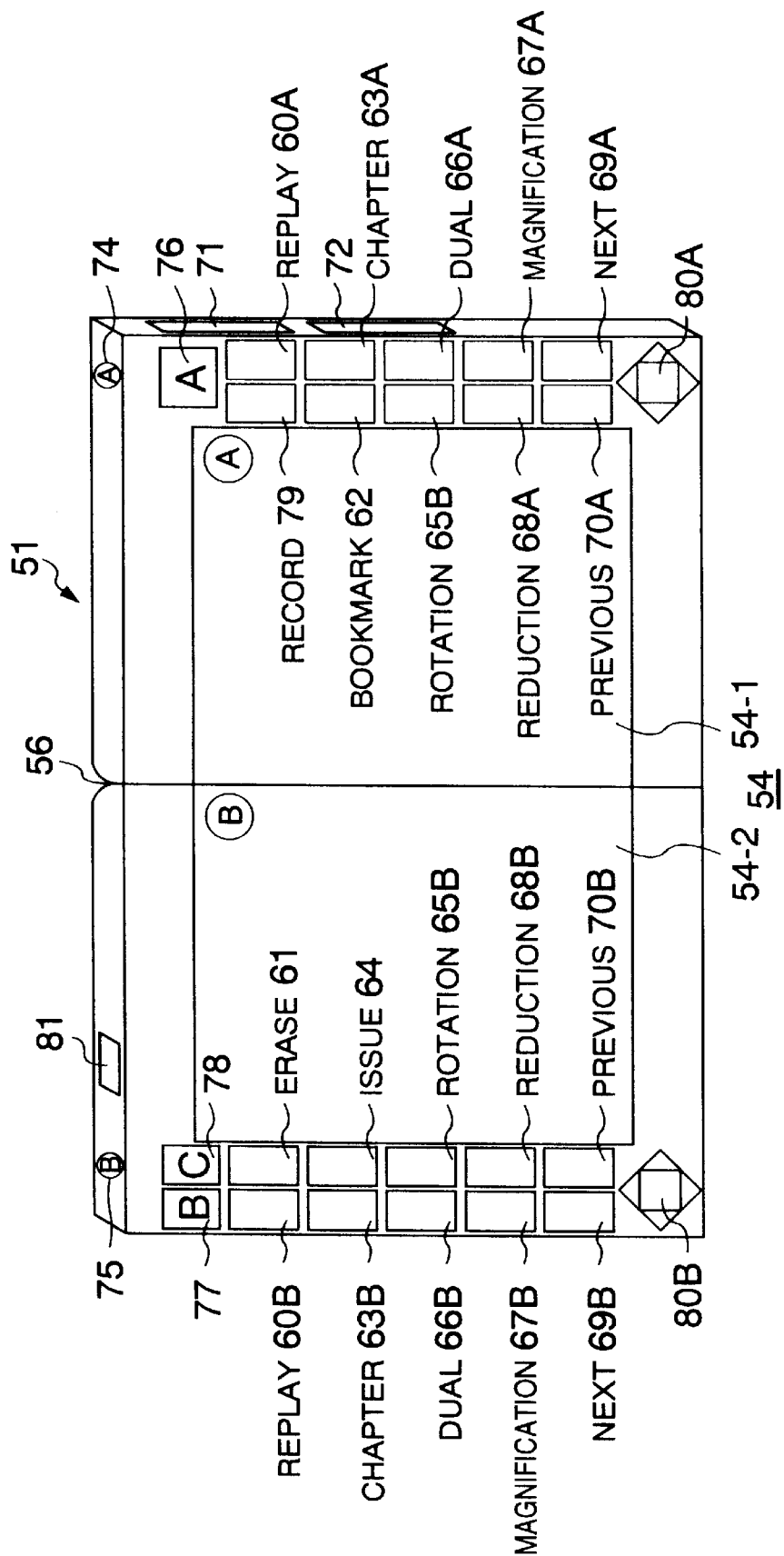
FIG. 10 shows an outer view of the image display device of the present invention and the console panel.
Figure 11:
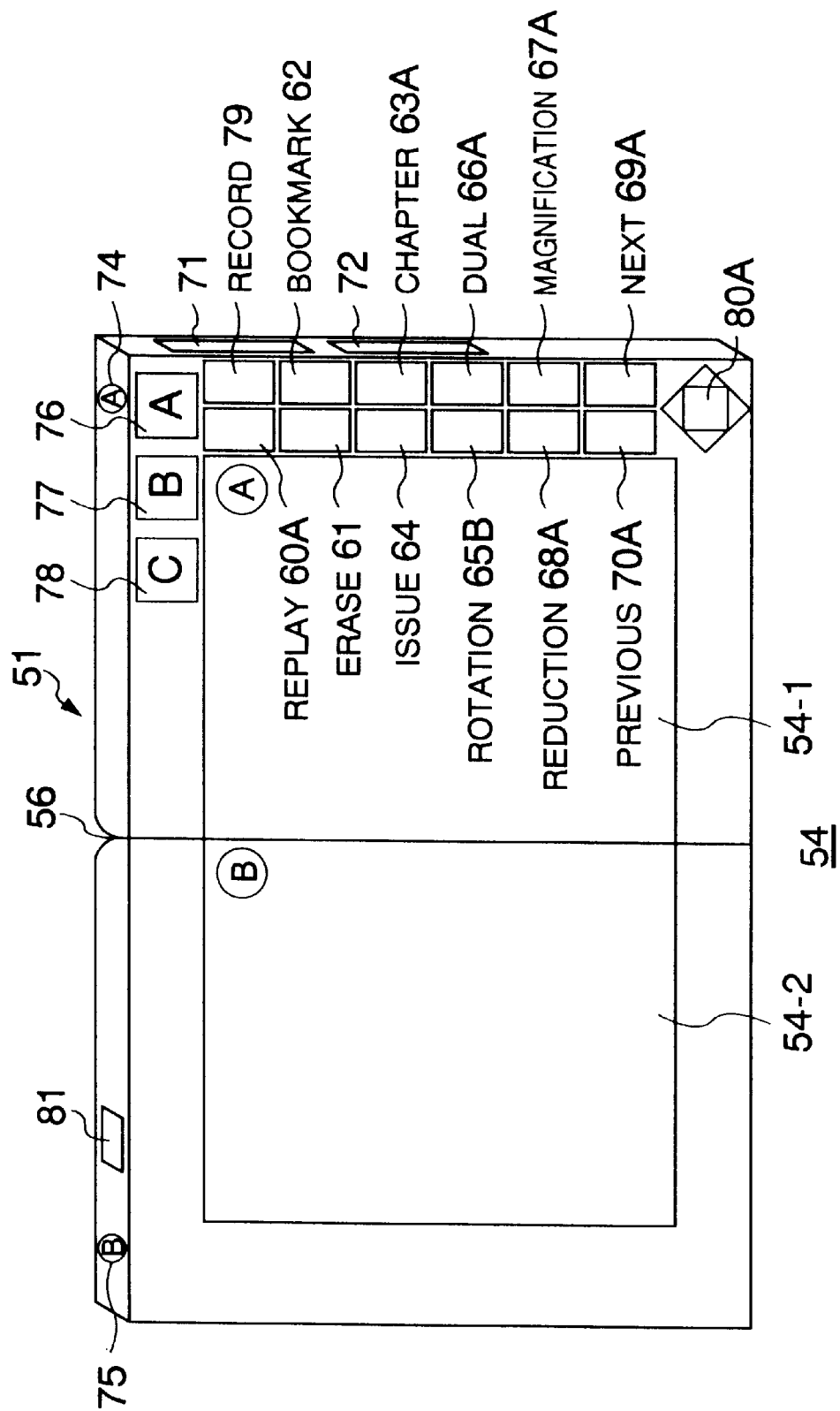
FIG. 11 shows an appearance of the image display device of the present invention and the console panel.

FIGS. 9~11 show appearances of the console panel 519. The console panel is provided with a power button 81, screen drive buttons 74 and 75 for the dual LCDs 54, screen selection buttons 76 and 77 for selecting the screen, previous item button 70 and next item button 69 which provide a paging function, a vertical/horizontal display selection button (rotation button) 65, a magnification button 65, a reduction button 67, a menu button for displaying data content, a bookmark button 62 for memorizing the last displayed page and a scroll button 80 for selecting vertical and lateral scrolling. The respective buttons are explained in more detail.

(1) Screen Drive Button

In the drawings, numerals 74 and 75 denote power buttons to dive the display screens A and B, respectively.

(2) Screen Selection button

In the drawings, numerals 76 and 77 denote screen buttons to select the display screens A and B. When the button 76 is depressed, the screen A of the LCD 58 (display screen 54-1, on the right side in the open position) is selected, and when the button 77 is depressed, the screen B (display screen 54-2, on the left side in the open position) is selected.

(3) Magneto-Optical Driver Button

In FIGS. 10 and 11, when the button 78 is depressed, 522C of the driver C (for the magneto-optical disk) is selected.

(4) Replay Button

1̂ Numerals 60A and 60B denote replay buttons for commanding the display of the first page or the second page of the compressed image data (document) stored in the IC memory card 52 mounted on the driver 71 or 72 (corresponding to the driver 522 of FIG. 8). When the replay button is depressed while the screen button 76 and 77 are not depressed, the first page or the second page of the IC memory card 52 mounted on the drive 71 or 72 is displayed on both of the display screens 54-1 (screen A) and 54-2 (screen B) of the LCED 54 in the dual-screen integral display mode as shown in FIG. 23(J).

2̂ When the replay button 60A or 60B is depressed after the screen button 76 or 77 is depressed, the first page of the memory card 52 mounted on the driver 71 or 72 is displayed on the display screen 54-1 (screen A) or the display screen 54-2 (screen B) for which the screen button of the LCD 54 has been depressed in the dual-screen independent display mode.

When the display mode is switched from the dual-screen integral mode to the dual-screen independent mode, the original display image displayed on the display screens 54-1 (screen A) and 54-2 (screen B) is reduced so that it is displayed on one of the display screen 54-2 (screen B) and the display screen 54-1 (screen A) of the LCD 54.

Figure 34:
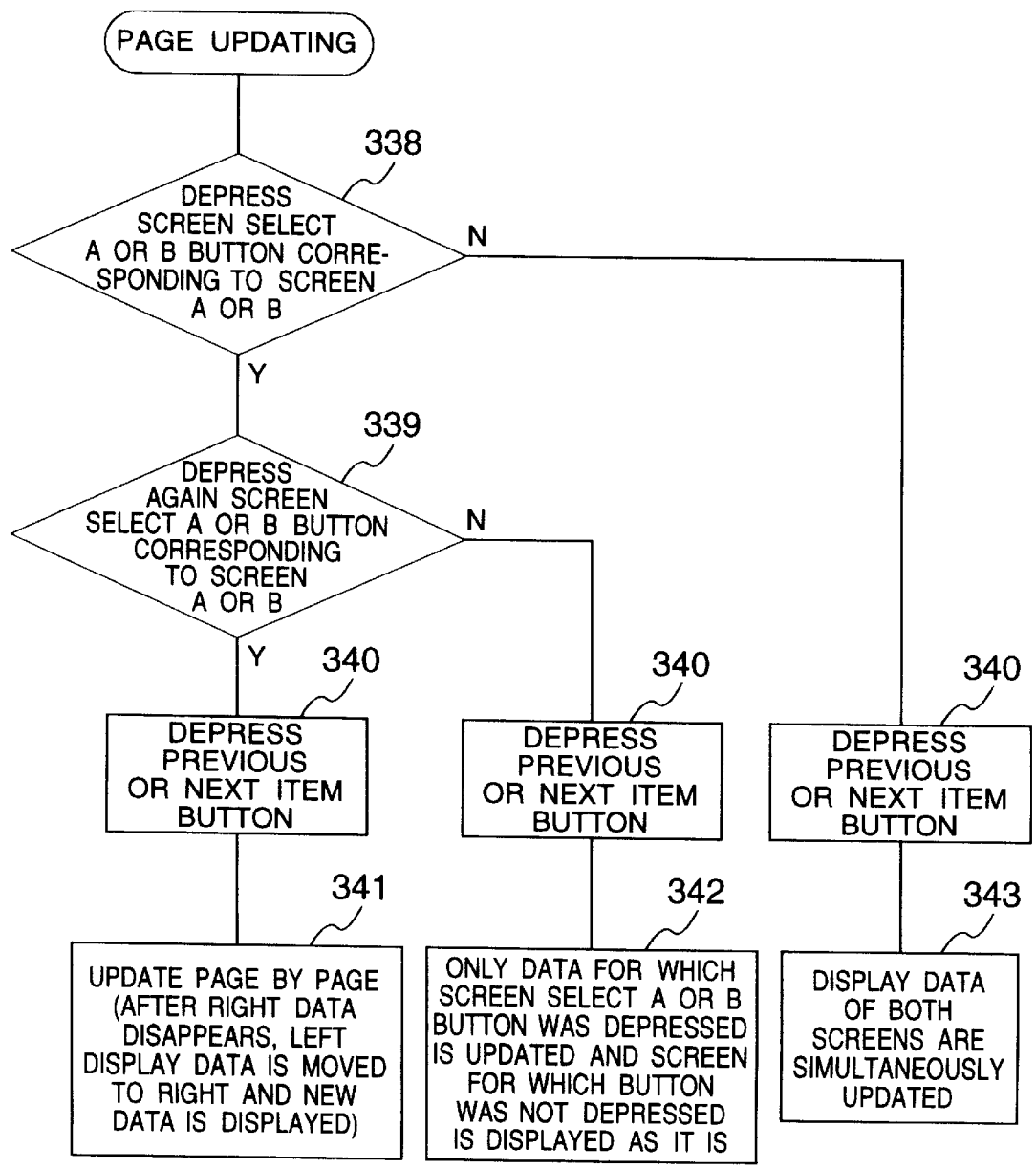
FIG. 34 shows a flow chart of page updating of the image display device of the present invention.

When replay button 60A or 60B is depressed after the screen button 76 or 77 is depressed serially, the image displayed on the display screen 54-1 (screen A) is moved to the other display screen 54-2 (screen B) and displayed thereon (FIG. 34).

3̂ When the replay button is depressed after the screen button 78 is depressed, the first one issue of data recorded in the magneto-optical disk (driver C) is transferred to the IC memory 52 mounted on the driver 72 and the first page of the transferred data is displayed on the display screen 54-2 (B) of the LCD 54. When the replay button 60A is depressed, the depression of the screen button 78 is disregarded and the first page inthe memory card 52 mounted on the driver 71 is displayed on the display screen 54-1 (screen A).

(4) Record Button

1̂ Numeral 79 denotes a record button for overwrite copying on the display screen. When the record button 79 is depressed, the first page of data in the memory card mounted on the driver 71 is displayed on the display screen 54-1 (screen A) and the first page of data in the memory card mounted on the driver 72 is displayed on the display screen 54-2 (screen B).

2̂ When the record button is depressed simultaneously with the replay button 60A, the data of the memory card mounted on the driver 71, which is displayed on the display screen 54-1 (screen A) is overwrite-copied to the next of the data (page) of the memory card mounted on the driver 72, which is displayed on the display screen 54-2 (screen B).

3̂ When a chapter button 63A or an issue button 64 is depressed immediately before the record button 79 and the replay button 60A are simultaneously depressed, the chapter or issue which contains the page (image) displayed on the display screen 54-1 (screen A) is overwrite-copied to the next of the data (page) of the memory card mounted on the driver 72, which is displayed on the display screen 54-2 (screen B).

(5) Erase Button

1̂ Numeral 61 denotes an erase button. When the erase button is depressed simultaneously with the replay button, the page displayed on the display screen 54-2 (screen B) is erased from the magneto-optical disk of the driver C.

2̂ When the chapter button 63B or the issue button 64 is depressed immediately before the erase button and the replay button 60B are depressed simultaneously and than the screen button 78 is depressed, the chapter or issue which contains the page displayed on the display screen 54-2 (screen B) is erased from the magneto-optical disk.

(6) Paging Button

Numerals 69A and 69B denote next page buttons. When this button is depressed, the next page is displayed on the display screen as shown in FIG. 35. Numerals 70A and 70B denote previous page buttons. When this button is depressed, the previous page is displayed again as shown in FIGS. 35B and 35C. Namely, when these buttons are depressed, the paging function is performed. The next page buttons 69A and 69B and the previous page buttons 70A and 70B correspond to the memory cards of the drivers 71 and 72, respectively, and the paging is performed in accordance with the card data.

(7) Issue Button

1̂ The issue button 64 is provided to sequentially display the first pages of issues on the display screen. When this button is depressed and the previous page button 70 or the next page button 69 is further depressed, the previous or next page is displayed.

2̂ The designation of issue may be made by the record button 79 and the erase button 61.

(8) Chapter Button

1̂ The chapter buttons 63A and 63B are provided to sequentially display the first pages of chapters on the display screen for the data in the IC memory cards of the drivers 71 and 72.

2̂ When the chapter button 63A or 63B is depressed and the previous page button 70A or the next page button 69A is depressed, the page of the previous or next chapter is displayed for the data of the memory card of the driver 71 or 72.

3̂ The designation of chapter may be made by the record button 79 and the erase button 61.

(9) Rotation Button

Figure 24:
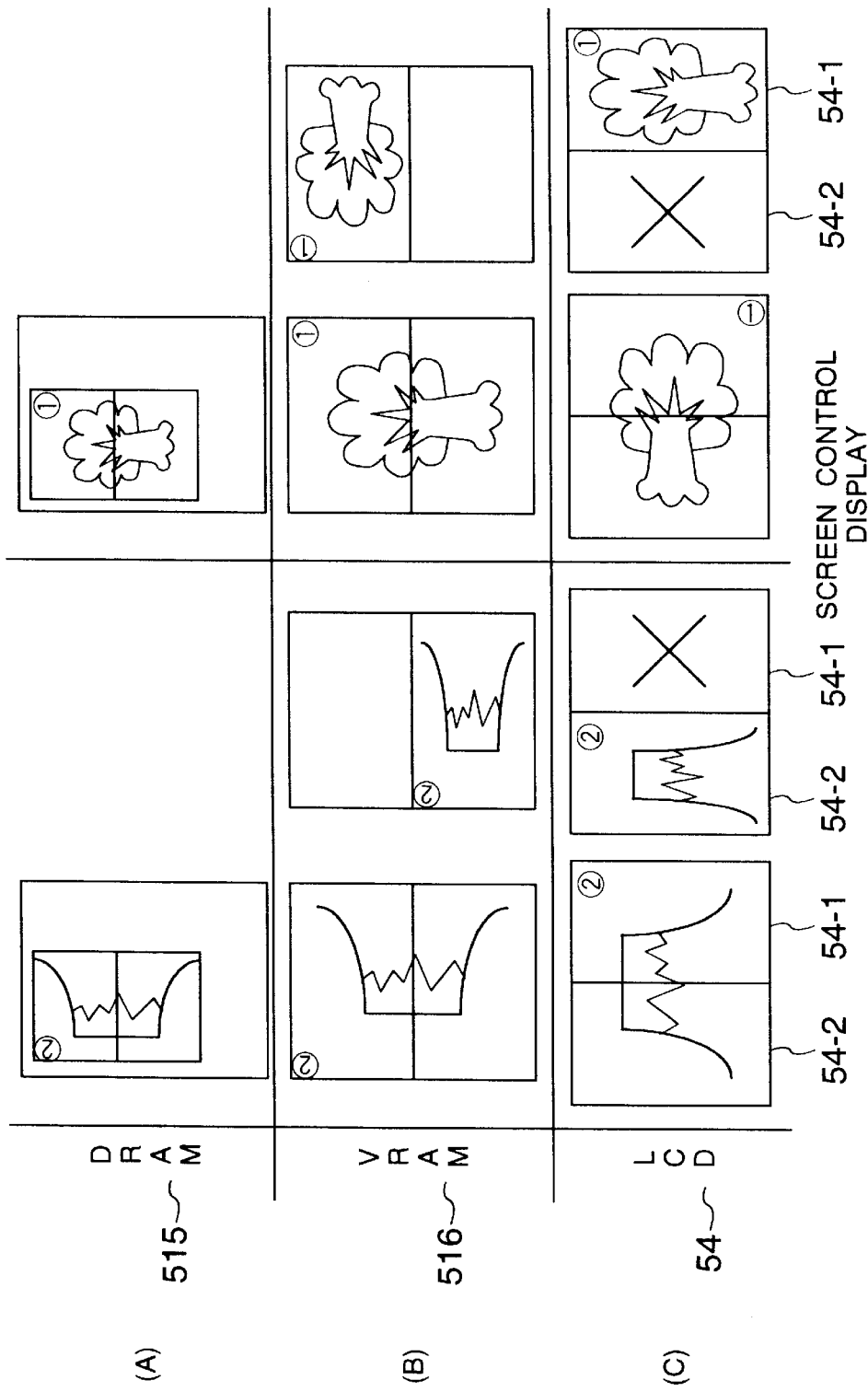
FIG. 24 shows display of image control of the image display device of the present invention.
Figure 25:
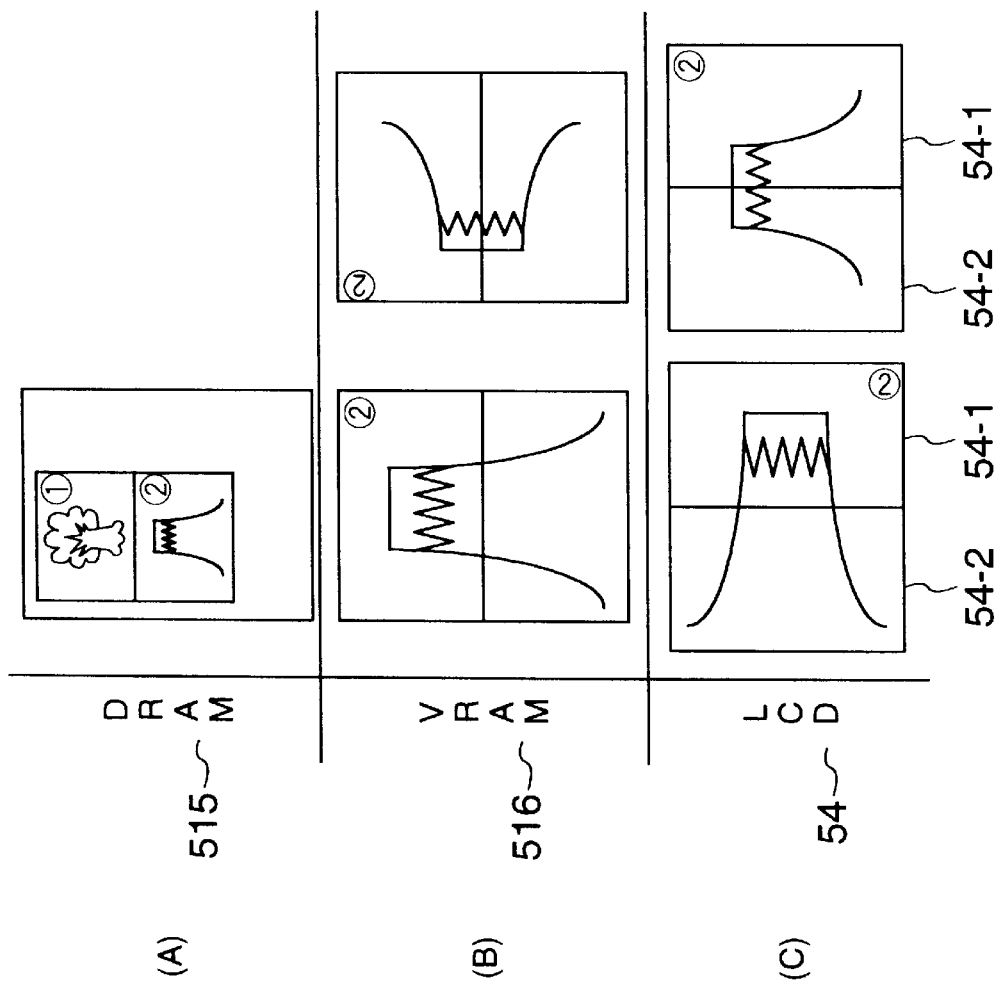
FIG. 25 shows display of image control of the image display device of the present invention.
Figure 26:
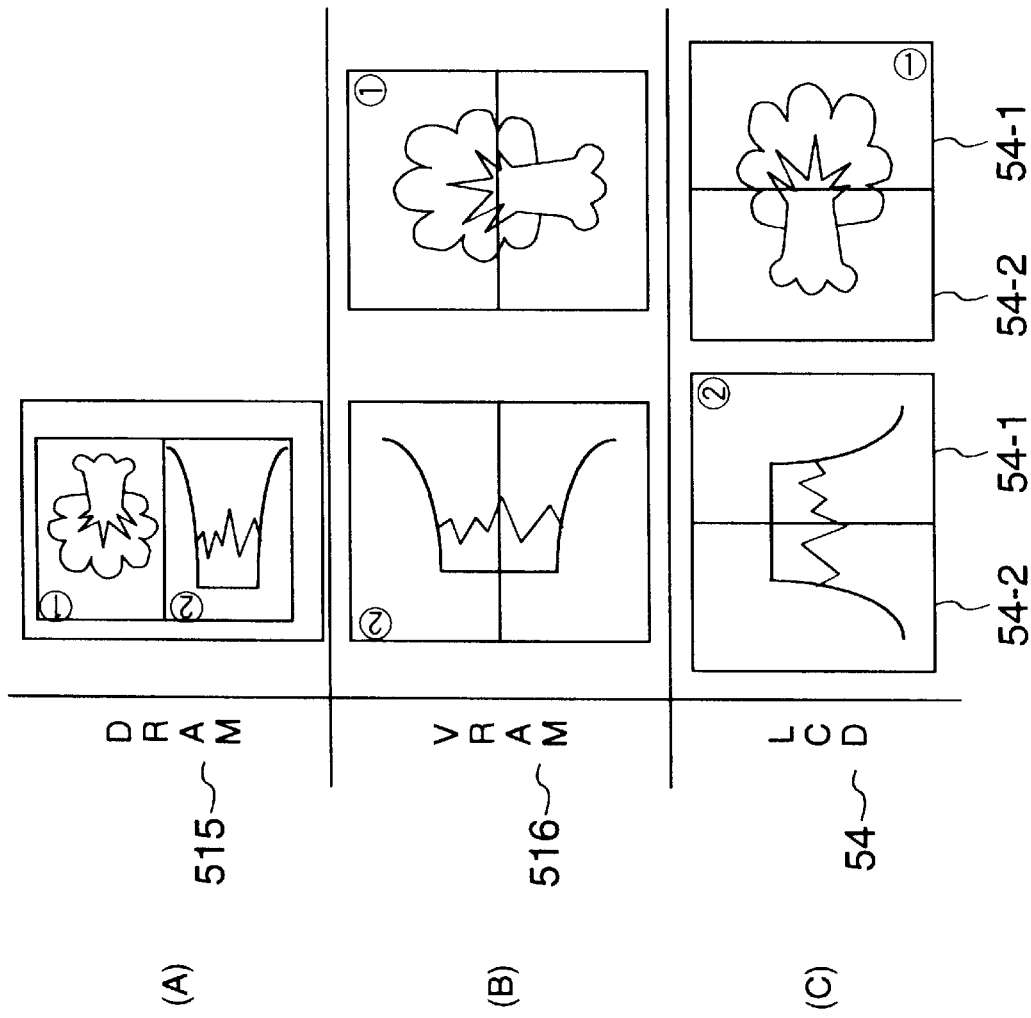
FIG. 26 shows display of image control of the image display device of the present invention.
Figure 27:
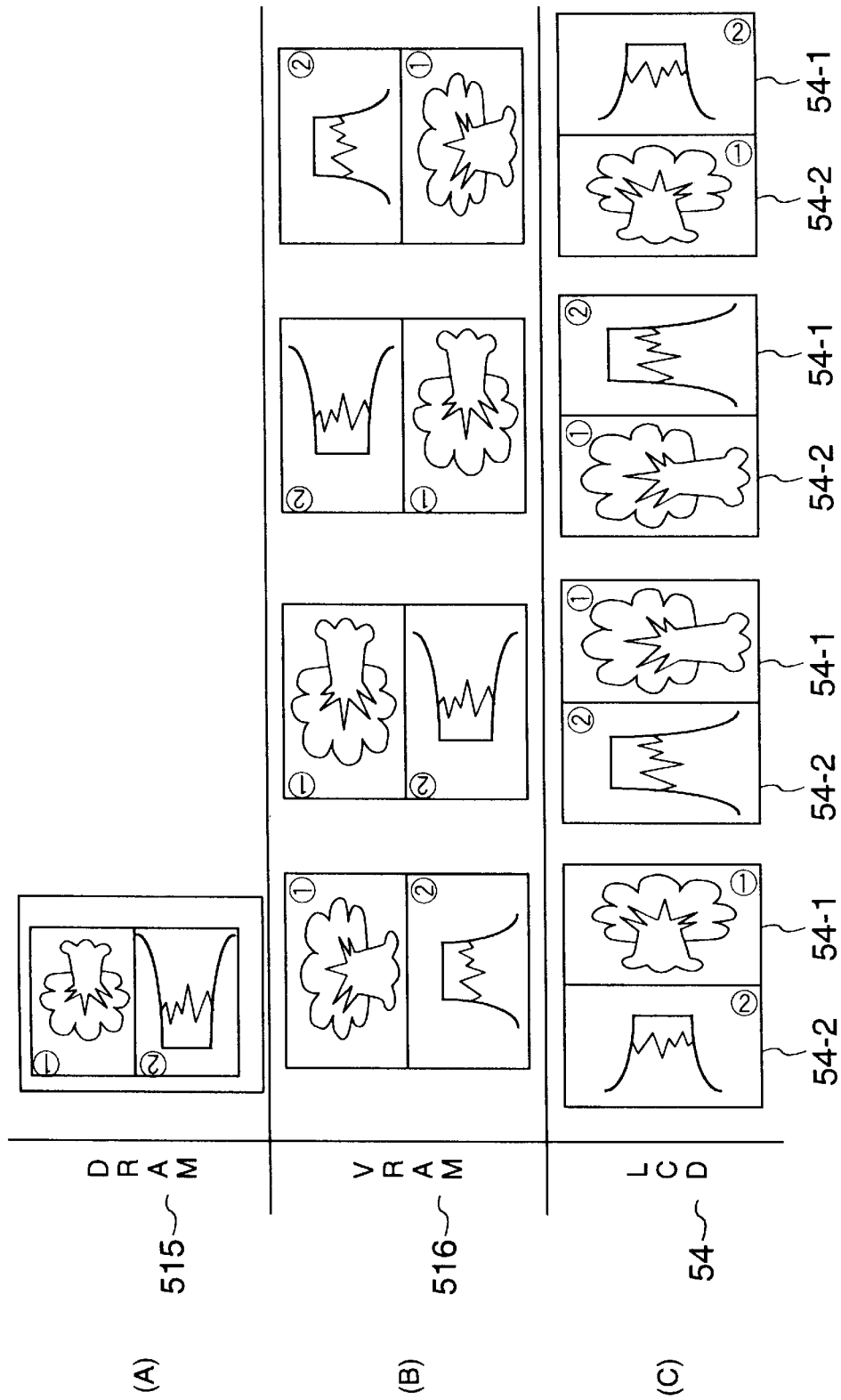
FIG. 27 shows display of image control of the image display device of the present invention.
Figure 28:
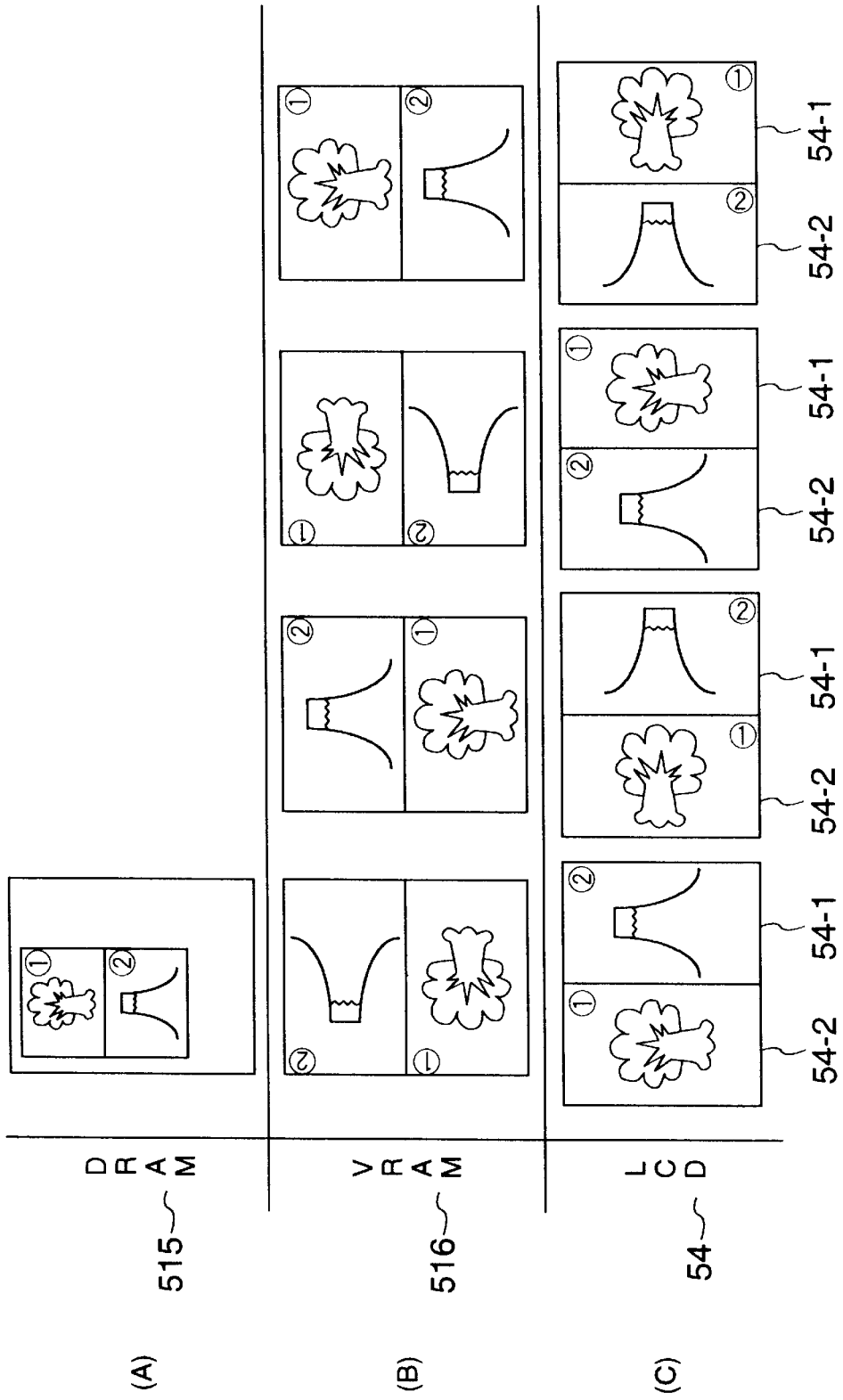
FIG. 28 shows display of image control of the image display device of the present invention.
Figure 29:
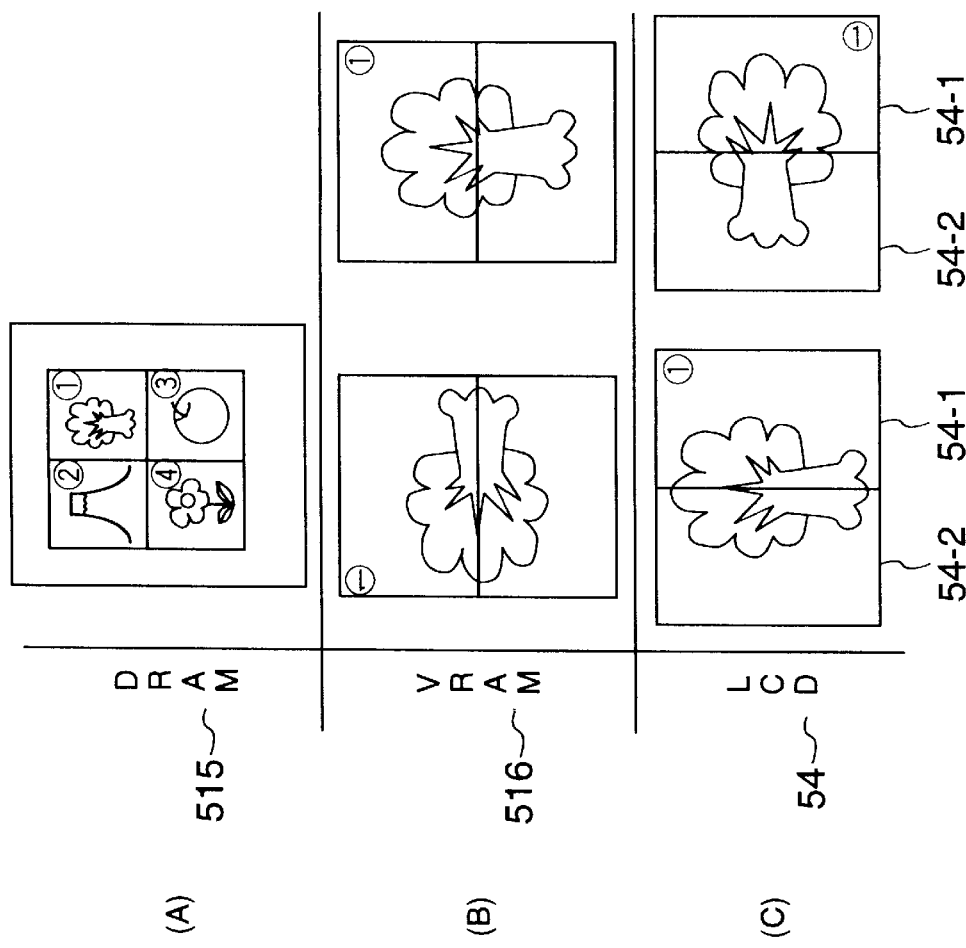
FIG. 29 shows display of image control of the image display device of the present invention.

Numeral 65 denotes a button which permits the rotation of the display image on the display screen by 90 degrees clockwise to display image in portrait or landscape as shown in FIG. 24A.

(10) Screen Display

1̂ When the screen button 66A or 66B is depressed in the dual-screen integral display mode, the data displayed on the display screen 54-1 (screen A) or the display screen 54-2 (screen B) for which the screen button has been depressed is displayed on both display screen. However, when the original data extends over the dual image screens and the screen button 66A or 66b is depressed, the data of the card memory, is displayed on the display screen 54-1 (screen A) or the display screen 54-2 (screen B) and nothing is displayed on the other display screen 54-2 (screen B) or the display screen 54-1 (screen A).

(11) Magnification Button

1̂ Numerals 67A and 67B denote magnification buttons for magnifying the display image on the display screen. In the dual-screen integral display mode, when the magnification button is depressed, marks indicating nine magnification reference points of each of the dual LCDs 54 (18 in total) are displayed as shown in FIG. 21. Under this condition, one of the magnification reference points (1̂, 2̂, 3̂, 4̂, 5̂, 6̂, 7̂, 8̂, 9̂ of FIG. 21) is selected by a cursor button 80A or 80B and then the magnification button 67A or 67B is depressed so that the dual LCDs 54 are integrated in one and the display image is magnified by a factor of two.

2̂ In the dual-screen independent mode, when the magnification button 67A or 67B is depressed, nine magnification reference points are displayed on the display screen 54-1 (screen A) of the LCD 54 corresponding to the magnification button as shown in FIG. 21A. Nothing is displayed on the display screen 54-2 (screen B) of the other LCD 54. One of the magnification reference points is selected by the cursor button 80A or 80B and then the magnification button 67A or 67B is depressed so that the display image size magnified by the factor of two on the display screen 54-1 (screen A) of the LCD 54 or the display screen 54-2 (screen B) of the LCD 54.

When further magnification is desired with the same magnification reference point, the magnification button is depressed twice so that the selection of the magnification reference point by the cursor may be omitted.

(12) Reduction Button

1̂ Numerals 68A and 68B denote reduction buttons to reduce the display image on the display screen. In the dual-screen integral mode, when the reduction button is depressed, the currently displayed area is displayed at the center of the screen by a reduction factor of two on one screen including the dual LCDs 54. When further reduction is desired, the reduction button may be depressed twice.

When the data to be displayed is smaller than the number of dots of the LCD 54 in the most reduced screen and non-data area appears on the LCD, that area is displayed in white or black uniformly. Information of document title may be displayed. While this area is arranged vertically symmetrically on the display device but in the horizontal direction, it is not provided in the area facing the hinge and provided only in the opposite area. Thus, the images displayed on the dual LCDs 54 appear continuously.

2̂ In the dual-screen independent mode, when the reduction button is depressed, the currently displayed area is displayed at the reduction factor of two at the center of the display screen 54-1 (screen A) or the display screen 54-2 (screen B) of the dual-screen LCDs 54. When the data to be displayed is smaller than the number of dots of the LCD 54 on the most reduced screen and non-data area appears on the LCD, that area is displayed white or black uniformly. Information of document title may be displayed. This area is provided vertically and horizontally symmetrically on the display device. Thus, the images displayed on the dual LCDS 54 are displayed independently.

(13) Bookmark Button

Numeral 62 denotes a bookmark button. When this button is depressed and then the power button 81 is turned off and then on, the screen immediately before the turn-off is displayed.

(14) Cursor Button

Cursor buttons 80A and 80B are provided to move the display screen vertically and horizontally. They are also used to select the magnification reference point.

Figure 12:
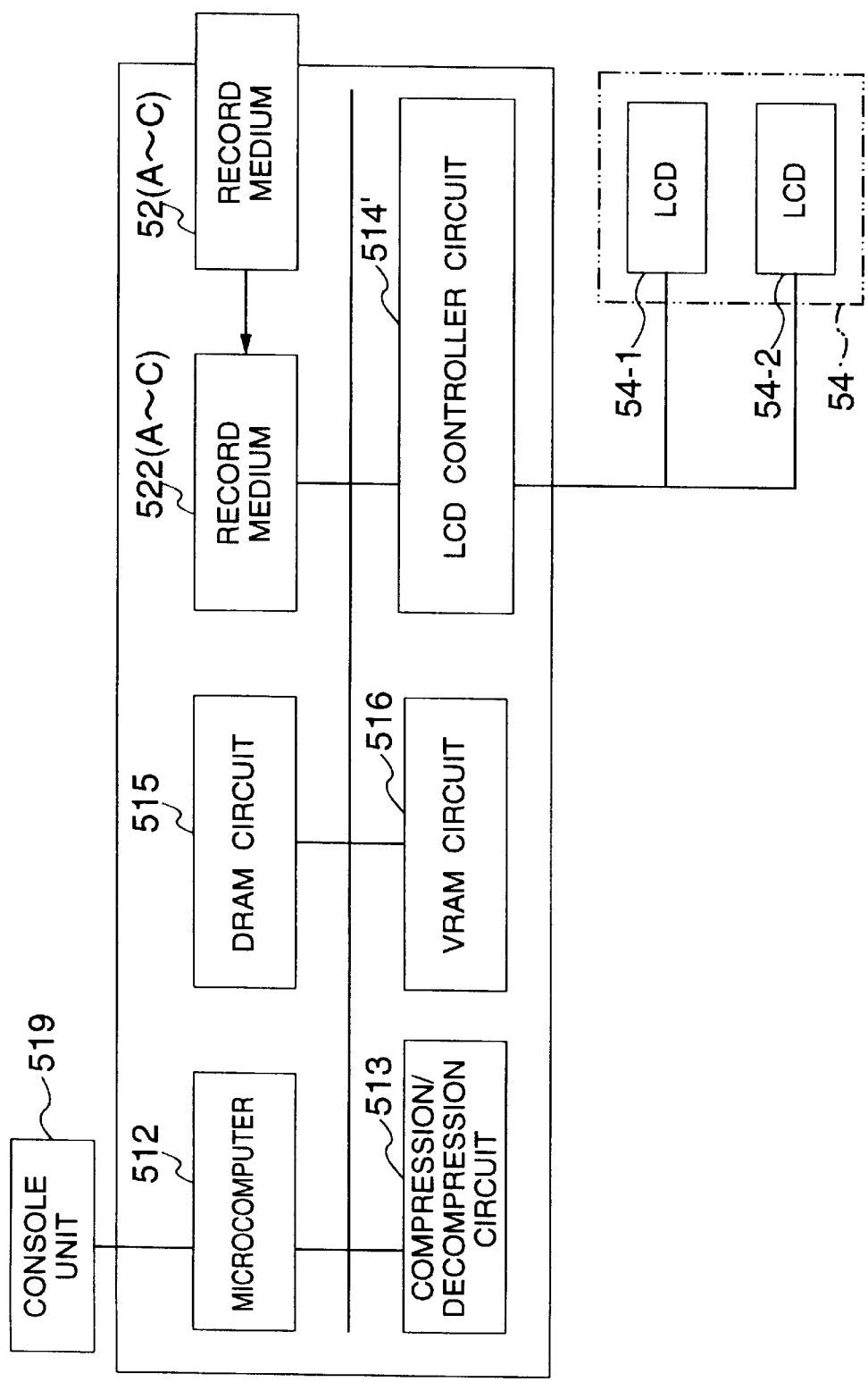
FIG. 12 shows a basic configuration of the electronic circuit of the image display device of the present invention.
Figure 13:
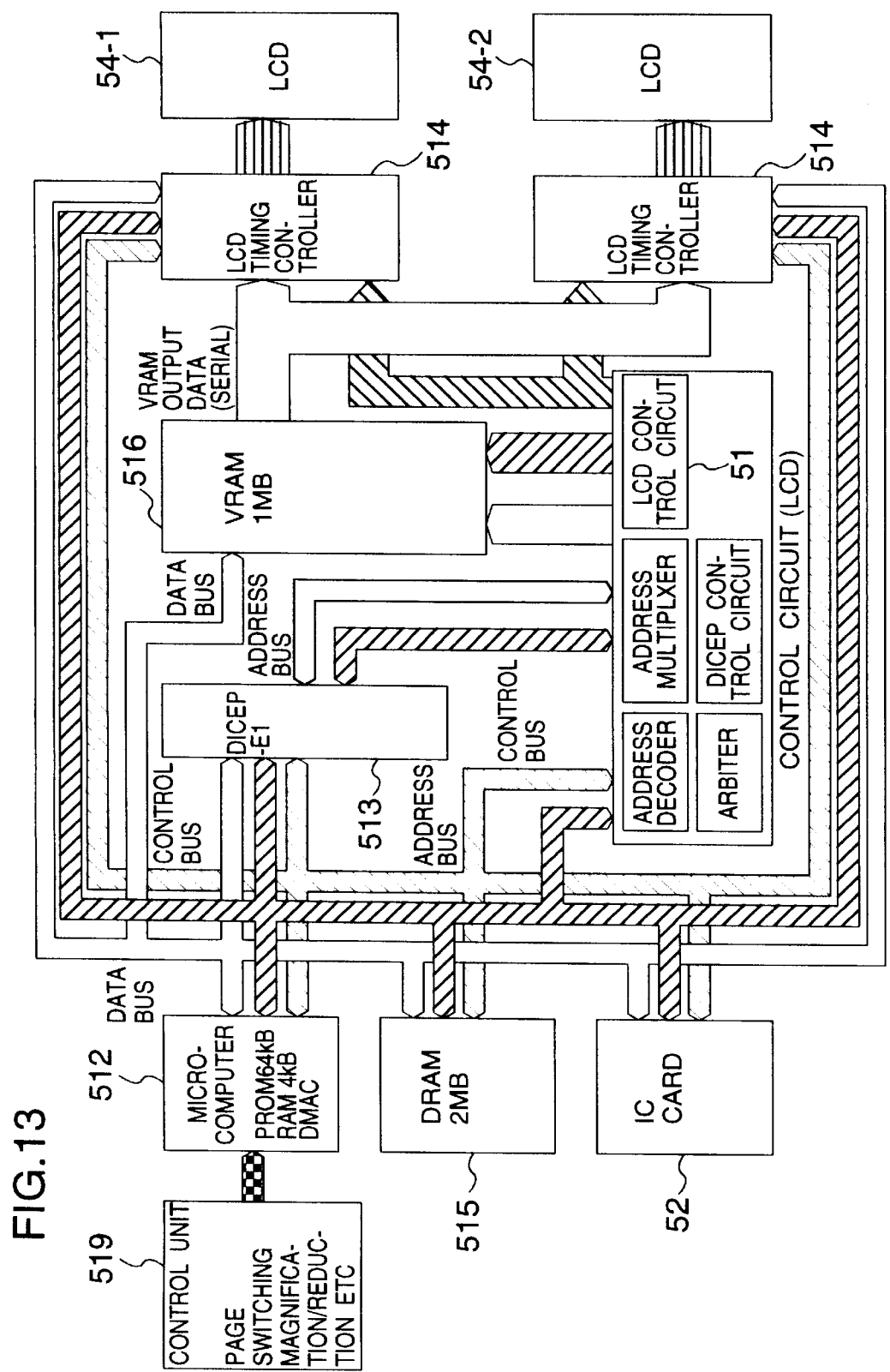
FIG. 13 shows a configuration of a block diagram of the electronic circuit of the image display device of the present invention.

An operation of the present invention is now explained. FIG. 12 shows an electronic circuit basic configuration of the present invention and FIG. 13 shows electronic circuit block diagram. The device basically comprises a display unit comprising the LCD 54, an electronic circuit and a console unit including a console panel. Major elements of the electronic circuit comprise a record medium unit 522 having a record medium 52 such as an IC memory card loaded therein for reading compressed data of column image stored or the medium, a decompressor 513 for restoring a predetermined amount of data red from the record medium to uncompressed original data, a memory circuit 515 having a DRAM for holding spread or two pages of data decompressed by the decompressor, a memory circuit 516 including a VRAM for thinning the data of the DRAM circuit directly or by a predetermined amount in accordance with the mode of the console unit 519, rearranging it and temporarily storing, a microcomputer unit 512 for processing the data and an LCD timing controller circuit 514 for timing the transfer of data to the LCD 54. The console unit 519 controls a display mode such as magnification, reduction and paging of the image to be described later. The display unit comprises two LCDs 54 (54-1 and 54-2). The gates such as the timing circuit are built in the control circuit such as a PLD (programmable device) as much as possible so that the number of parts is reduced for the circuit design which takes the reduction of the thickness and the weight of the device into consideration from the standpoint of structure.

[LCD]

In the present embodiment, the LCD 54 is a monochromatic STN reflection type from the standpoint of cost. Major technologies of the current LCD comprises the STN (super twisted nematic) and TFT (thin film transistor) and there is currently a difference in the factor of two to three in the costs thereof. When concept of "one set to one person" is applied to the development of the product, the factor of: the price is very important and the low cost monochromatic STN reflection type is adopted in the present embodiment. In future, a color type or a TFT type may be adopted.

An interface between the LCD and the electronic circuit unit comprises two parts, one for the data to the LCD and the other for the timing signal.

[Electronic Circuit Unit]

A detail of the electronic circuit unit is described below. The DRAM circuit 515 for holding the image data of the column, the VRAM circuit 516 for outputting to the LCD 54 and the timing controller circuit 514' for outputting the data to the LCD 54 are described. An electronic circuit configuration block diagram is shown in FIG. 13.

[DRAM Circuit]

Figure 14:
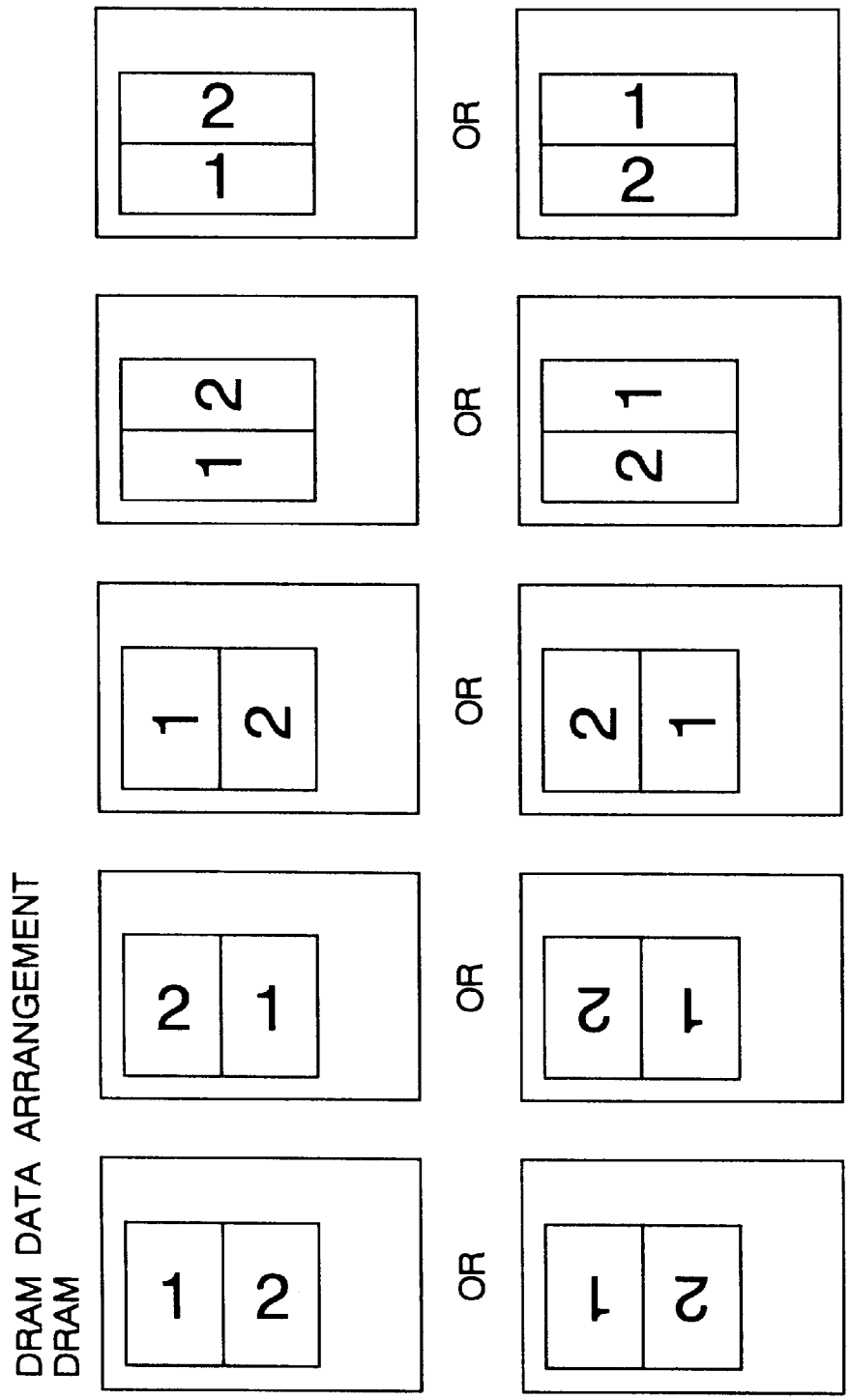
FIG. 14 shows arrangement of data to a DRAM of the image display device of the present invention.
Figure 15:
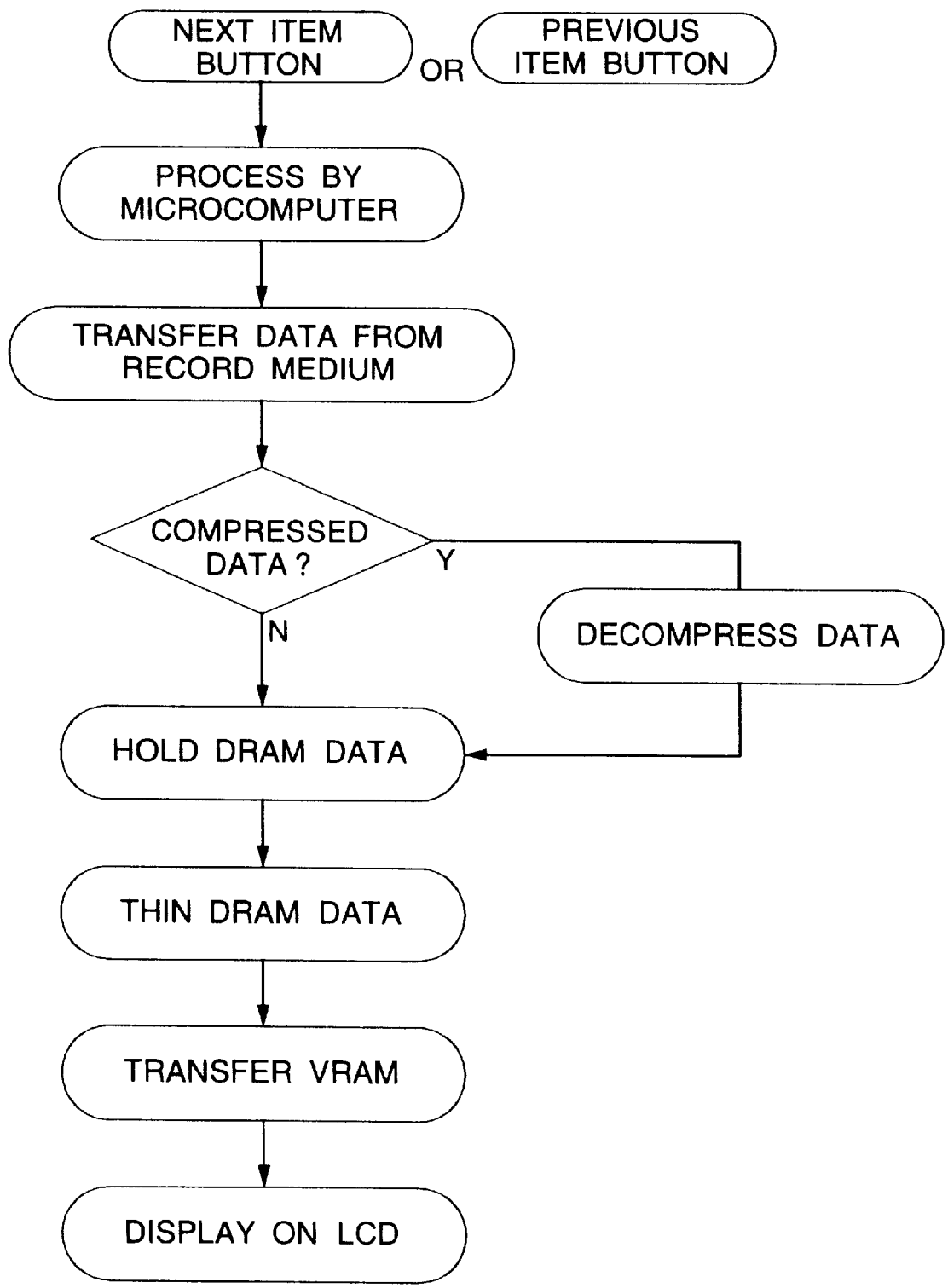
FIG. 15 shows a flow chart; of a process of display data of the image display device of the present invention.

One page of column data (2M bytes) recorded on the record medium 52 is restored to the original data by the compressor/decompressor 513 and it is stored in the DRAM (dynamic RAM) memory 515. In another embodiment, two pages of data (4M bytes) is held in the memory to hold the data corresponding to the dual-screen independent display operation. Since the 640×480 dots LCD 54 is used for the display, the data is thinned for the display. A data arrangement when two data developed to the image data are temporarily stored is shown in FIG. 14.

In the present embodiment, the compression/decompression of the MMR is conducted by hardware. An operation speed is higher when it is conducted by the hardware than it is by software. In the present embodiment, an MMR compression/decompression chip called DICEP-E1 is used for the compression/decompression hardware.

[VRAM Circuit]

The VRAM circuit 516 has a function to thin the column image data from the DRAM memory 515 in accordance with the display mode, rearrange it, temporarily store it and output it to the LCD timing controller 514'. The VRAM (video RAM) adopted in the present embodiment is a 2M bits multi-port video RAM comprising 256K words×8 bits SAM (serial access memory). The VRAM 516 is provided for each LCD. The data capacity of one screen is the display capacity 640×480 dots=300K bits of the LCD, which is large enough to store several screens of data.

Since the RAM unit and the SAM unit are operable independently and asynchronously, the access by the microcomputer 512 from the CPU to the RAM may be conducted independently from the bilateral data transfer between the RAM and the SAM. The column image data is sent from the serial port of the VRAM 516 to the LCD timing controller 514'. The VRAM circuit 516 comprises a peripheral circuit for reading and writing from the CPU of the microcomputer 512, a circuit for timing for RAS and CAS in synchronism with a memory access request arbiter, and address multiplexor and an address decoder.

[LCD Timing Controller Circuit]

The LCD timing controller 514' has a function to output the data from the VRAM 516 to the LCD 54 for display. An LCTC (LCD timing controller IC) receives the column image data outputted from the VRAM 516 at the 16-bit serial input and sends data at the 8-bit output in synchronism with a signal to drive the LCD 54. To this end, the LCD timing control circuit for timing the data output timing from the VRAM and the data output timing from the LCD timing controller 514' to the LCD 54 is provided. This circuit also detects the start timing to read the data by the LCD timing controller. Two LCTCs are provided one for each of the two LCDs.

[Data Arrangement]

A method for rearranging the data from the DRAM 515 by software is now explained. The data arrangement to the DRAM 515, the VRAM 516 and the LCD 54 is conducted in the manners shown in FIGS. 24–32. When the data is read into the DRAM 515 in the data format of A4-size portrait/400 dpi which is a standard in the present embodiment, the first page appears in the upper half of the A4-size portrait during the initial data holding in the record medium so that the page containing the earlier data items is displayed on the right screen (54-1) of the LCD 54. Basically, the data input to the DRAM 515 is conducted such that the data of the first page is entered in the upper half for the A4-size portrait and in the right half for the A4-size landscape.

In this method, even if the data volume increase or the format is changed, the entry to the DRAM 515 is conducted in the method which is close to the basic method as shown in FIG. 14 such that it is entered in the right half of the LCD 54. For example, when A4-size two-pages portrait data is entered in the DRAM 515, the earlier page data is thinned to the capacity of 640×480 which is the upper half data of the DRAM and it is transferred to the LCD. Similarly, the data of the remaining page is thinned to 640×480 and transferred. The data arrangement from the DRAM 515 to the VRAM 516 is determined by the display mode to the LCD 54.

When the data is read into the DRAM 515 in the standard format and it is displayed on then LCD 54 in the standard mode (contiguous display on the two spread pages), the right screen (54-1) of the LCD 54 corresponds to the earlier addresses of the VRAM 516 and the left screen (54-2) corresponds to the later addresses. The VRAM 516 is divided into two parts corresponding to the two display screens 54-1 and 54-2 of the LCD 54.

[A4-size One-Page Portrait]

When one-page display page is included in the format, the data is arranged such that the data at the top line of the display data of the DRAM 515 is at the top of the column address for the arrangement of the data to be read into the earlier addresses of the VRAM 516. Since the rearrangement of the VRAM 516 is determined depending on which one of left, right, top and bottom the arrangement of the display data of the DRAM 515 is based on, the data is read into the DRAM 515 in the manner shown in FIG. 14 for the standard data format.

When the LCD 54 is displayed in the one-screen portrait mode, the data of the page to be displayed in the DRAM 515 is transferred to the top address of the VRAM 516 in the address sequence. Since one page of data is displayed in two LCD screens, the DRAM display data is divided into two parts by address and they are transferred.

[A4-size Two-Pages Portrait]

When two-pages display is included in the format, the data is arranged such that the data of the top line of the page 1 of the display data of the DRAM 515 is at the top of the row address for the arrangement of the data to be read into the earlier addresses of the VRAM 516. Since the arrangement of the VRAM 516 is determined depending on which one of left, right, top and bottom the arrangement of the display data of the DRAM 515 is based on, the data is read into the DRAM 515 in the manner shown in FIGS. 24–28 for the standard format.

When the display screen of the LCD 54 is in the landscape two-page display mode, the data to be displayed on the DRAM 515 is divided into two parts and the top address data is transferred to the right screen (54-1) of the LCD 54 and the top data of the divided address is transferred to the left screen (54-2) of the LCD 54. When it is transferred, it is thinned to 640 dots for the LCD display and transferred to the addresses of the VRAM 516.

When the LCD 54 is displayed in the one-screen landscape display mode, the page data to be displayed on the DRAM 515 is transferred to the top addresses of the VRAM 516 in the address sequence. Since the one page of data is displayed on the two LCD screens, the DRAM display data is divided into two parts by address and they are transferred. When the LCD 54 is in the portrait one-screen display mode, one column of data of the DRAM 515 is transferred to one line of the VRAM 516. The data is divided by one-half column of the display data of the DRAM 515 and they are transferred to the VRAM 516. During the transfer, the data is thinned in accordance with the number of display dots of the LCD 54.

[A4-size Four-Pages Portrait]

When four-pages display page is included in the format, the four pages of display data of the DRAM 515 are divided into two parts by address for the arrangement of data to be read into earlier addresses of the VRAM 516, and the top addresses are further divided into two parts by column. The data is arrange such that the last column data of the first line is at the top of the line address of the VRAM 516. Since the rearrangement of the VRAM 516 is determined depending on which one of left, right, top and bottom the arrangement of the display data of the DRAM 515 is based on, the data is read into the DRAM 515 in the manner shown in FIGS. 29~30 for the standard data format. When the display screen of the LCD 54 is in the landscape two-page display mode and the LCD 54 is in the one-screen landscape display mode, the data is transferred in the method described above.

The thinning of the binary data is explained. The data is thinned by logically ORing adjacent data and data (black) of the binary data (black and white) is preferentially read. This is conducted for line and column and the line and columns OR results are combined for the respective display modes. For example, in the entire display, the original data are ORed for both line and column and the thinning of the data is displayed based on the crosspoint of the tops of the line address and the columns address. When the data exceeds the number of display dots of the LCD 54, the thinning is made up to the number of data closest to t-he number of display dots of the LCD 54 and the rest is cut off. When the data does not exceed, (white) data is inserted for display.

[Software]

Basically, the present display device performs a specific operation when one of the buttons shown in FIGS. 9~11 is depressed. The buttons shown in FIG. 9 are listed below and described. Letters in the parenthesis indicate buttons on the panel. Process flows are shown in FIGS. 15~19, 22 and 34.

[Screen Display mode]

As the screen display mode, the dual-screen independent mode (the A and B screens of left and right LCDs independently display. The data on the driver 51 is displayed by the A screen (54-1) and the data on the diver 52 is displayed on the B screen (54-2)) and the dual-screen integral display mode (the A and B screens (54-1 and 54-2) of the left and right LCDS are displayed in one) are included.

[Operation Immediately After Power-On]

Immediately after the power-on, the first page on the diver 71 is displayed on both of the A and B screens (54-1 and 54-2) of the LCD 54. If the data format in the IC memory card is A4-size one-page, one page is displayed by using two screens. If it is A5-size two-pages, one page is displayed on each of the left and right LCDs 54 854-1 and 54-2). If it is A6-size four-pages, the upper two screens are displayed on the LCDs 54 (54-1 and 54-2), respectively. This is not changed even when the replay button A is depressed.

[Screen Display Method]

The record medium (IC memory card) 52 having the compressed image data recorded thereon is mounted on the record medium drive unit 522, the data on the record medium is read and the read data is decompressed for the display area of the LCD 54 (one-page, two-pages or four-pages area) by the decompressor 513 and it is transferred to the memory circuit 515. In accordance with the display on the LCD 54, the data of the display screen of horizontal 3,232 dots×vertical 4,736 dots corresponding to the high resolution A4-size 400 dpi, for example, is transferred to the memory circuit 515. Assuming that the display screens 54-1 and 54-2 of the LCD 54 is A5-size 640×480 dots, the resolution is 85 dpi, and when the A-4 size screen is formed by two A5-size LCDs, the resolution is 60 dpi. Since the LCD 54 has the resolution of this value, the screen may be magnified or reduced to display the image information up to the fineness of 400 dpi. However, in the screen magnification, the entire image cannot be displayed on the screen.

The data transferred to the memory circuit 515 is transferred to the memory circuit 516 directly or after the thinning to the display area corresponding to the LCD 54 depending on the magnification or reduction mode of the console unit 519, and the memory circuit 516 temporarily holds the transferred data. In the finest display mode described above, the data is transferred directly, and in other screen reduction modes, the data is thinned so that the image is entirely displayed in the range of 640×480 dots.

When the data of horizontal 3,232 dots×vertical 4,736 dots data corresponding to A-4size 400 dpi is used by thinning, it is thinned by the factor of 8 for both horizontal and vertical (only one dot of eight dots is displayed) so that it is horizontal 404 dots×vertical 592 dots and 640×480 dots are displayed on one screen. The magnification factor may be up to eight wherein in the most reduced state one A4-size page is displayed on one LCD. When the thinning is made by the factor of four for both horizontal and vertical (only one of four dots is displayed), it is horizontal 808 dots× vertical 1,184 dots and it almost accommodated in the dual-screen 640×(480×2). The magnification factor may be up to four assuming that in the most reduced state one A4-size page is almost displayed on two LCDs. (The lacked porion may be displayed by vertically and horizontally scrolling the image.)

The above shows an example. In this manner, the magnification and the amount of the corresponding data to be stored in the memory circuit (VRAM) 516 are determined. In the magnification mode, it is necessary to determine a reference point on the display screen, for example, a display center as the center for magnification. When the image is to be reduced, the display may be added around the displayed image and the reference point need not be determined. In the magnification and reduction modes, it is necessary to change the reference points between both screens to permit both of the independent use of two LCDs 54 (dual-screen independent display mode) and the use of two screens for one image (dual-screen integral mode). When the two LCDs 54 are used independently, which of the display screen 54-1 and the display screen 54-2 of the LCD 54 is to be magnified is first selected. When the two LCDs 54 (54-1 and 54-2) are used as one screen, the reference point for the magnification is set on one of the left and right screens. In the present embodiment, the reference point for the magnification is the center point of the image although it may be one of four corners, and the reference point is set at a point on the image. When the data is always displayed at the center of the display screen and a blank area with no data displayed appears, the display is adjusted such that the center of the image is always on the display screen and the blank data areas appear on four sides.

[Screen Color]

In the present embodiment, two LCD monochromatic displays are used. Since the color display may be more appropriate depending on the content of the display data, the color display is used in other embodiment. One of the dual-screen may be monochromatic and the other may be color. In any case, the display is selected by taking the cost into consideration.

[Image Data Format]

The image data format in the record medium used in the present display device is explained below. First, the image data is stored in the record medium 52 in data hierarchy form of classes of titles of the entire book, classes of contents and actual pages of columns.

The column data is stored in the compressed form. In the present embodiment, the compassion system is the MMR system. The data stored in the record medium 52 is decompressed by the data decompressor 513 and one page of A4-size 400 dpi data is transferred to the memory circuit (DRAM) 515. In the present embodiment, the A4-size 400 dpi standard is determined by the column data distribution system. In future, the data format may be determined in accordance with the improvement of the resolution of the LCD or the resolution of other compact and low resolution display device and the specification thereof and the system may be fitted thereto. In the present embodiment, the A4-size portrait data format is standard. Alternatively, the landscape format may be used. The capacity of the memory circuit (DRAM) 515 is one page of A4-size 400 dpi (2M bytes). For the display device which develops two pages of data onto the memory, the memory capacity is increased to 4M bytes. By lowering the resolution of the data format to, for example, A4-size 200 dpi as it is for the facsimile machine, four pages of data may be retained without increasing the capacity from 2M bytes. This is equivalent to store four pages of document sheets in one page of A4-size 400 dpi portrait data format (for example, four A4-size pages are arranged 2×2 vertically and horizontally, reduced into one A4-size page and electronized in the 400 dpi data format).

As an intermediate approach, the two A5-size pages of data may be handled in the manner described below. Since the present display device is capable of displaying on the LCD 54-1 and the LCD 54-2 independently or in combination, the data of the document sheet (A5-size) is displayed by division in accordance with the respective LCDs. The image of the A5-size document sheet is landscape. Since the A4-size portrait document sheet is reduced to A5-size, the image is landscape. Accordingly, it may be necessary to restore the original image by a rotation process of the image.

In this manner, three types of formats, one A4-size page, two A5-size pages and four A6-size pages, are produced. Additional information such as orientation of column and page sections for the two A5-size pages and the four A6-size pages are added thereto and the information is added as a header in front of the column data.

[Record medium and Data Compression Method]

The record media of the image data uses the memory card 52 in the embodiment. The memory card is considered lightest including the driver and it is appropriate for the present specification. However, the image data of the newspaper and cartoon is of a large volume such as approximately 80 MB for a morning paper (approximately 40 pages) and hence the data need be compressed. Of a number of data compression methods, the MMR (Modified Modified Relative Element Address Designate) 3) is adopted. The MMR system has a compression factor of lower than $\frac{1}{10}$ and has been used for the electronic publishing by the CD-ROM and it is technically reliable. The magneto-optical disk is used as a recording medium to store large volume of data.

[Screen Display Control]

Figure 23:
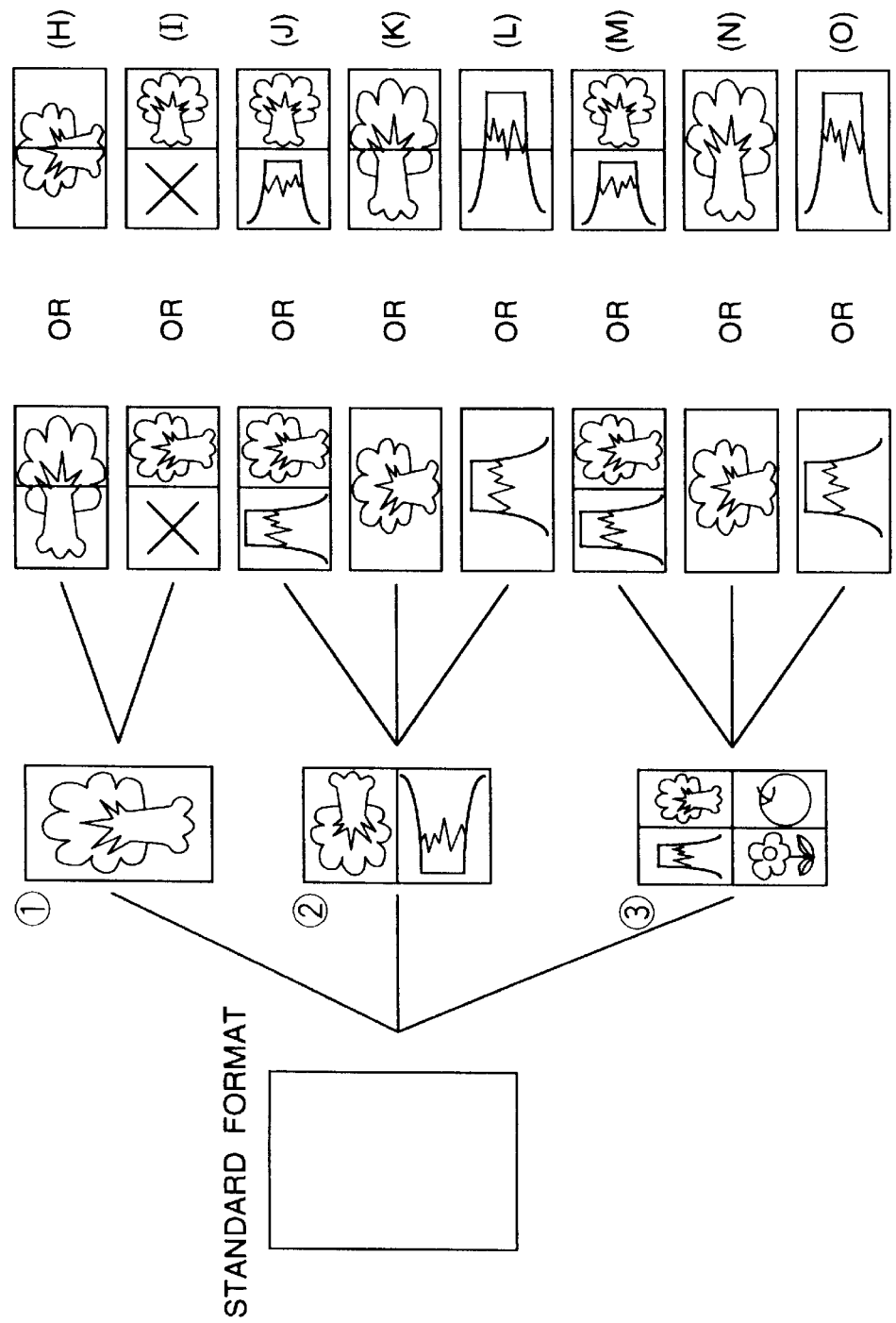
FIG. 23 shows a display system of the image data of the image display device of the present invention.

The screen control when the one A4-size page, two A5-size pages and four A6-size pages of images are electronized on the record medium in the A4-size portrait data format and the entire or a portion thereof is displayed on the two LCDs is described in the following sections (1)~(3) with reference to FIG. 23.

The fundamentals of the image control are as follows:

(a) Image (A4-size 400 dpi portrait data format)
    A4-size one-page display
    A5-size two-pages display
    A6-size four-pages display (b) Display Screen Selection
    One-page display by two LCDs
    Two-pages continuous display by two LCDs
    Independent display by two LCDs (c) Display Direction Selection (directions: Vertical or Lateral)
    Independent on two LCDs
    Linked on two LCDs (1) A4-size one-page The screen control when the portrait image of the A4-size one-page of data is electronized on the record medium in the A4-size 400 dpi portrait data format is explained. The data transferred from the record medium 52 to the memory circuit (DRAM) 515 (entire or portion thereof) is displayed on the two LCDs 54 in the following manner (see FIG. 24).

The two LCDs are displayed in one screen (54-1 and 54-2).

The display direction is upward, downward, rightward or leftward relative to the display device. One of the left and right LCDs 54 is displayed as one screen (54-1 or 54-2).

The display direction is upward, downward, rightward or leftward relative to the display device.

(2) A5-size Two-Pages

The screen control when the A5-size two-pages data is electronized side by side on the record medium in the A4-size 400 dpi portrait data format is explained. The data transferred from the record medium 52 to the memory circuit (DRAM) 515 (entire or portion thereof) is displayed on the two LCDs 54 in the following manner.

The two LCDs 54 are combined in one screen (54-1 and 54-2) and one of the left and right A5-size images is selectively displayed. The display direction is upward, downward, rightward or leftward relative to the display device (see FIGS. 25~26).

The A5-size image is displayed on each of the left and right LCDs 54. When two pages of A5-size are electronized side by side, the right A5-size image is displayed on the right LCD 54-1 and the left A5-size image is displayed on the left LCD 54-2. The images of the respective LCDs are independent and the display direction is upward, downward, rightward or leftward relative to the display device (see FIGS. 27~28).

(3) A6-Size Four-Pages

The screen control when the A6-size four-pages data is arranged in portrait in horizontal 2×vertical 2 image and electronized in the record medium in the A4-size 400 dpi portrait data format is explained. The data transferred from the record medium 52 to the memory circuit (DRAM) 515 (entire or portion thereof) is displayed on the two LCDs 54 in the following manner.

The two LCDs 54 are combined to one (54-1 and 54-2) and one of the A6-size four-pages images is selectively displayed. The display direction is upward, downward, rightward or leftward relative to the display device (see FIG. 29).

Two A6-size images are displayed on the left and right LCDs. When the A6-size four-pages of data in portrait are arranged in vertical 2×horizontal 2 and electronized, two of the A6-size images arranged side by side vertically are selected and the right image thereof is displayed on the right LCD 54-1 and the left image is displayed on the left LCD 54-2. The images of the respective LCDs are independent and the display direction is upward, downward, rightward or leftward relative to the display device (see FIG. 30).

Two A6-size images are displayed on the right and left LCDs. When the A6-size four-pages data is electronized in portrait in vertical 2×horizontal 2, the two A6-size images are selected for the left and right LCDs and displayed thereon. The images of the respective LCDs are independent and the display direction is upward, downward, rightward or leftward relative to the display device (see FIG. 30).

In other embodiment, the A4-size one-page data format is stored in each of two memoirs as shown in FIG. 30. Alternatively, the display content may be represented by two A4-size 0.5-page data format as shown in FIG. 32.

[Magnification and Reduction]

The magnification and reduction are described in sections (1)–(5) below with reference to FIG. 20. The magnification function operates in the same manner for both of the vertical and horizontal displays.

(1) One-page Display

When the two LCDs are combined to one screen (54-1 and 54-2) and only one page is displayed, the entire display screen is magnified or reduced. The area which is not displayed due to the magnification may be displayed by scrolling the image (in the magnified state).

(2) Two continuous pages are handled as one image

When one page and the next following page are displayed on toe LCDs and when an area in the first page is magnified or reduced, two pages of display data are handled as one and the two pages are simultaneously displayed by magnification. For example, when the right page is magnified, the area on the left page (which is also magnified) which is not displayed due to the magnification may be displayed by scrolling the image (in the magnified state).

(3) Two-Pages Independent

As shown in FIG. 20B, in the two)-pages display mode, only the page $\hat{3}$ displayed on one LCD 54-1 is magnified and the page $\hat{4}$ displayed on the other LCD 54-2 is displayed as it is. Any one of the screens may be selected for magnification. The area on the LCD screen 54-1 which is not displayed due to the magnification may be displayed by scrolling the image (in the magnified state).

(4) Two LCDs are Handled in One and Pages are Independent

In the two-pages display mode, only the page $\hat{3}$ displayed on one LCD 54-1 is displayed in magnification on one screen combined with the other LCD 54-2. The page displayed on the other LCD 54-2 disappears. Which one of the screens is used for magnification is selectable. The area in the magnified LCD screen which is not displayed due to the magnification may be displayed by scrolling the image (in the magnified state) (see FIG. 20C).

(5) Entire Image on One Side and Magnified Image on The Other Side

Figure 33B:
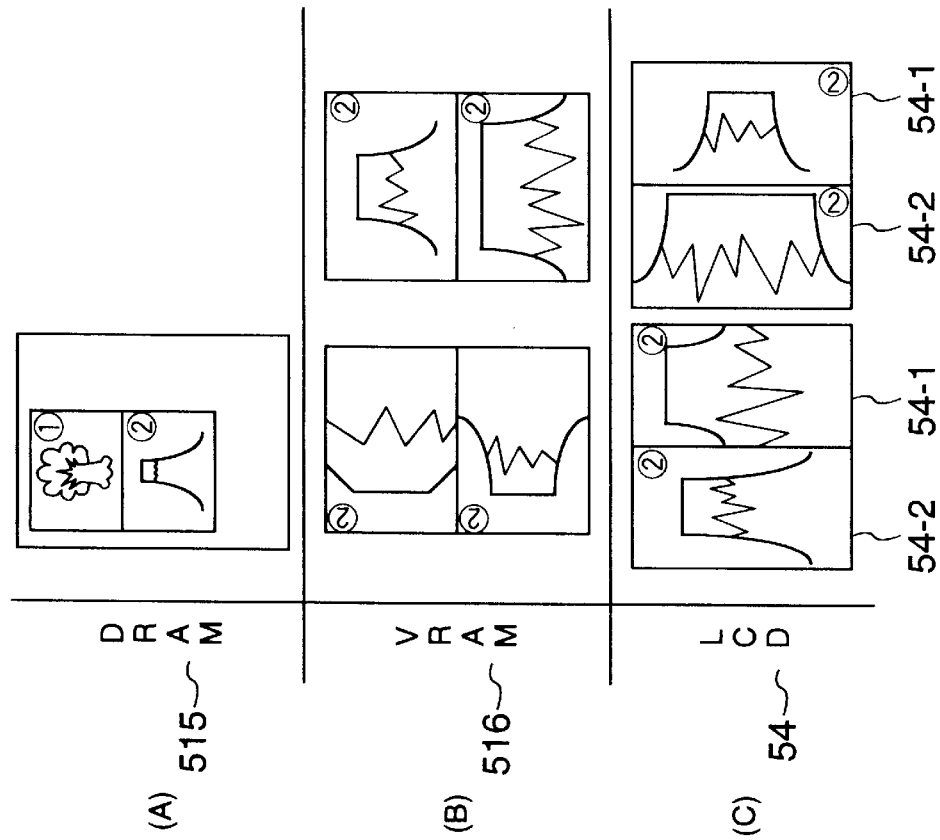
FIGS. 33A and 33B show displays of a magnified screen of the image display device of the present invention.
Figure 33A:
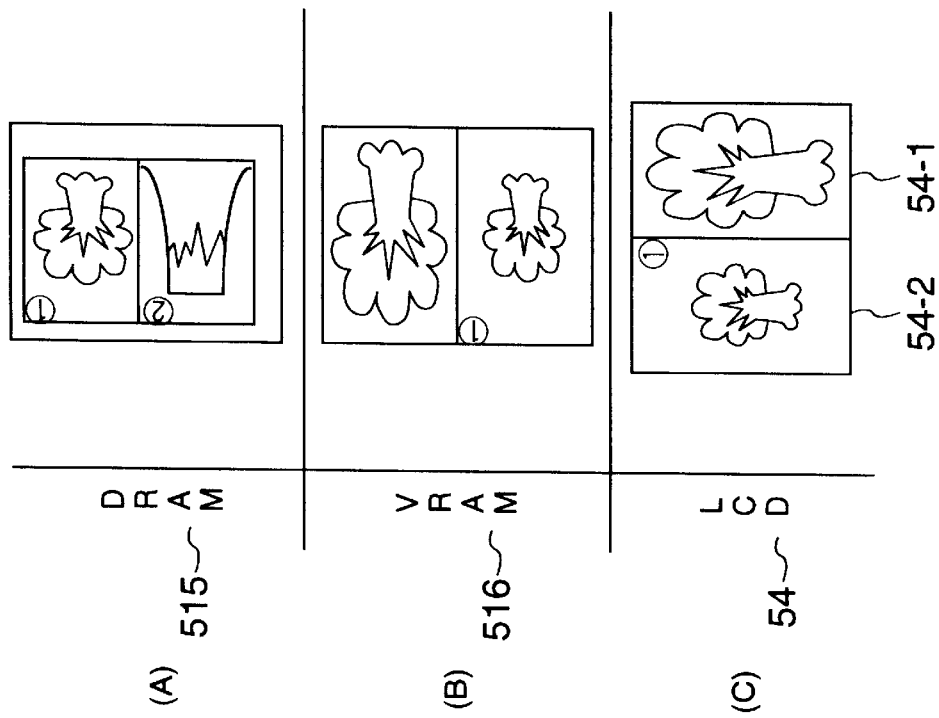

When two pages are displayed on the two LCD screens (54-1 and 54-2) and one of the LCDs (for example, the right 54-1) is magnified, the image displayed on the other screen (the left 54-2) disappears and the image of the right LCD before the magnification is displayed (or one entire image is displayed). The center (or other predefined point) of the magnified area is displayed to allow the discrimination of the magnified area. When the two LCDs are combined in one to display one page, this function may be used. In this case, the one-screen by two LCDs mode is changed to the dual-screen mode (see FIGS. 33A and 33B).

[Reference Point of Magnification]

The reference point of magnification is explained with reference to FIG. 21. Nine reference points $\hat{1}$–$\hat{9}$ are set in the screens 54-1 and 54-2, respectively, to magnify the two LCDs 54. The magnification o d the reduction are performed around the reference points. By setting nine points, the entire display screen may be enlarged. For the selection of the reference points, one screen (54-1 or 54-2) of the LCDs 54 is selected and locations of the reference points $\hat{1}$–$\hat{9}$ set in the screen are selected by scrolling. When one screen is displayed by the two LCDs, the reference points $\hat{1}$–$\hat{1}8$ are selected throughout the screen and in the dual-screen display mode, nine reference points for the two screens are set. When one of the two LCDs is exclusively used for the magnification screen and the other is used for the unmagnified data display, nine reference points are set on the unmagnified display screen.

In other embodiment, the position is detected by a transparent film which detects the position when the screen is touched by a finger or a pen (a known device measures electrical resistances from the opposite ends of the screen to the touch point and detects the position from a ratio thereof) and the magnification is made around the point (see FIG. 21).

[Hierarchy of Electronic Column Data]

As the record medium 52, the IC memory card and the magneto-optical disk may be used. Several books of documents may be stored in the magneto-optical disk and one book of data is transferred to the IC memory card so that the IC memory card is used I-or the display of document in one book.

One book is hierached by chapter and page. The page is the A4-size 400 dpi portrait data format, for example, the horizontal 3,232 dots×4,736 dots (approximately 2 m bytes) data. The chapter is aggregation of a plurality of pages and the section is determined based on the content of the sentences. The page is a sheet in the chapter and the page includes A4-size one-page, A5-size two-pages and A6-size four-pages.

[Start]

Figure 16:
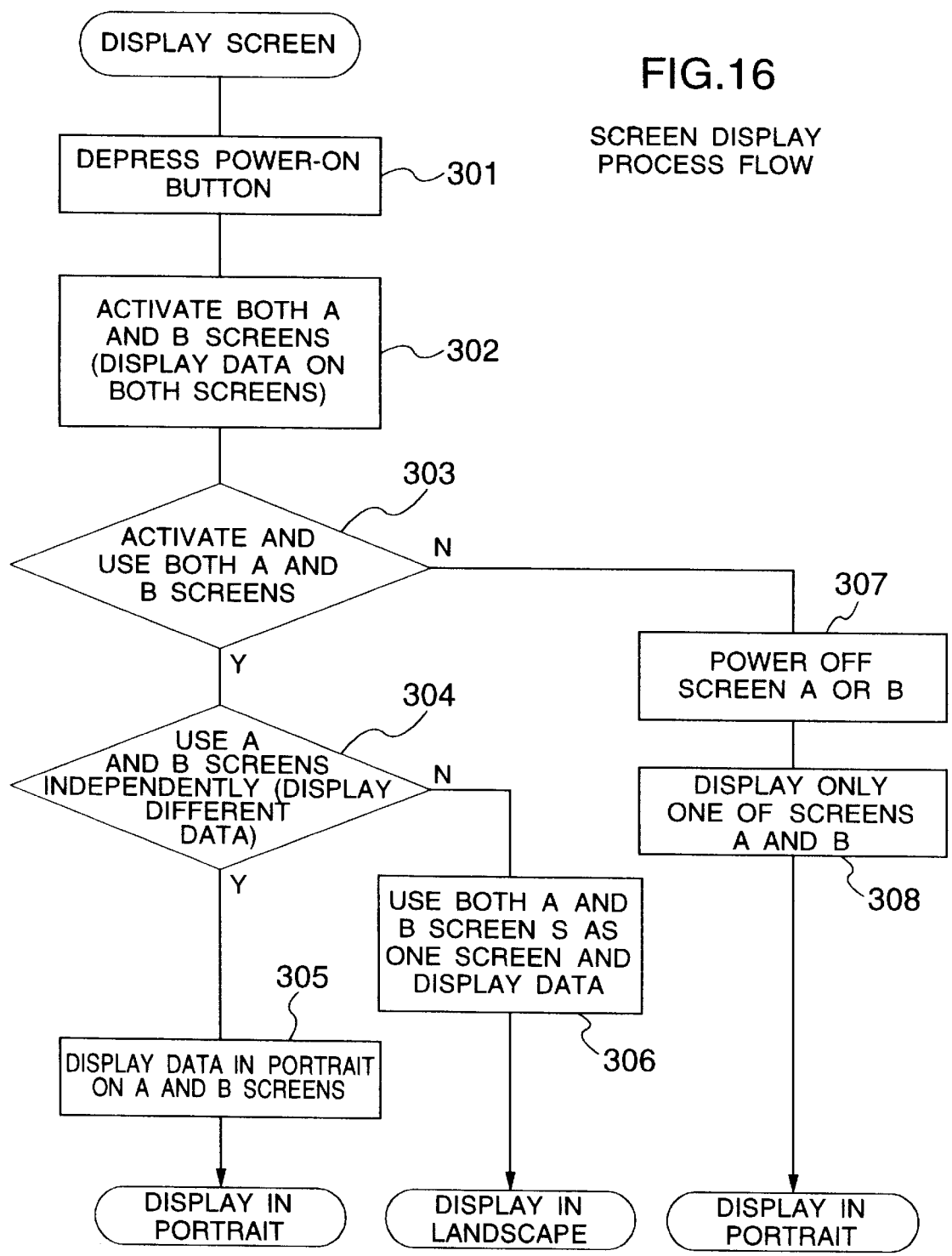
FIG. 16 shows a flow chart of an image display process of the image display device of the present invention.
Figure 17:
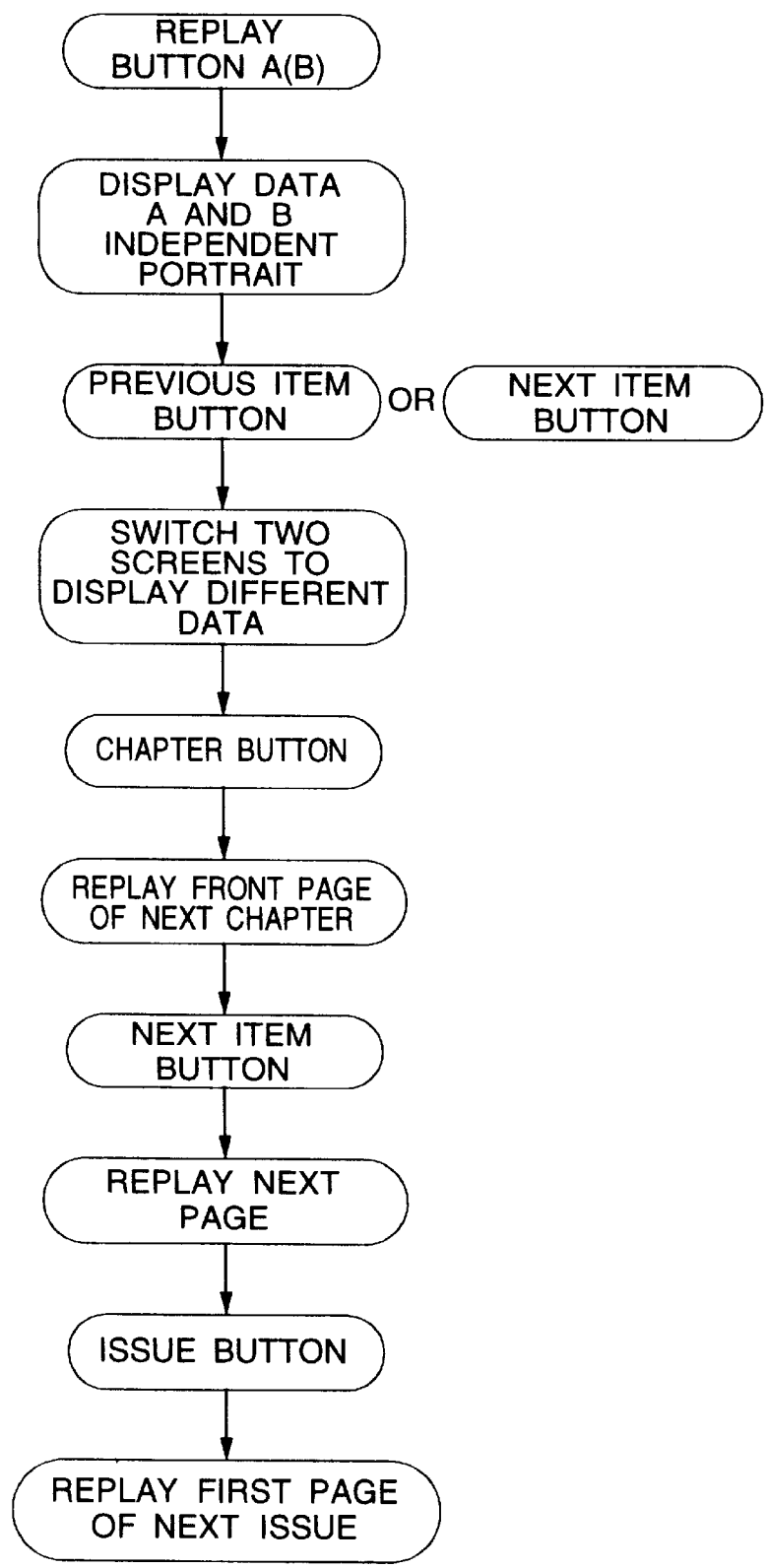
FIG. 17 shows a flow chart of a reproduction process of image data of the image display device of the present invention.
Figure 18:
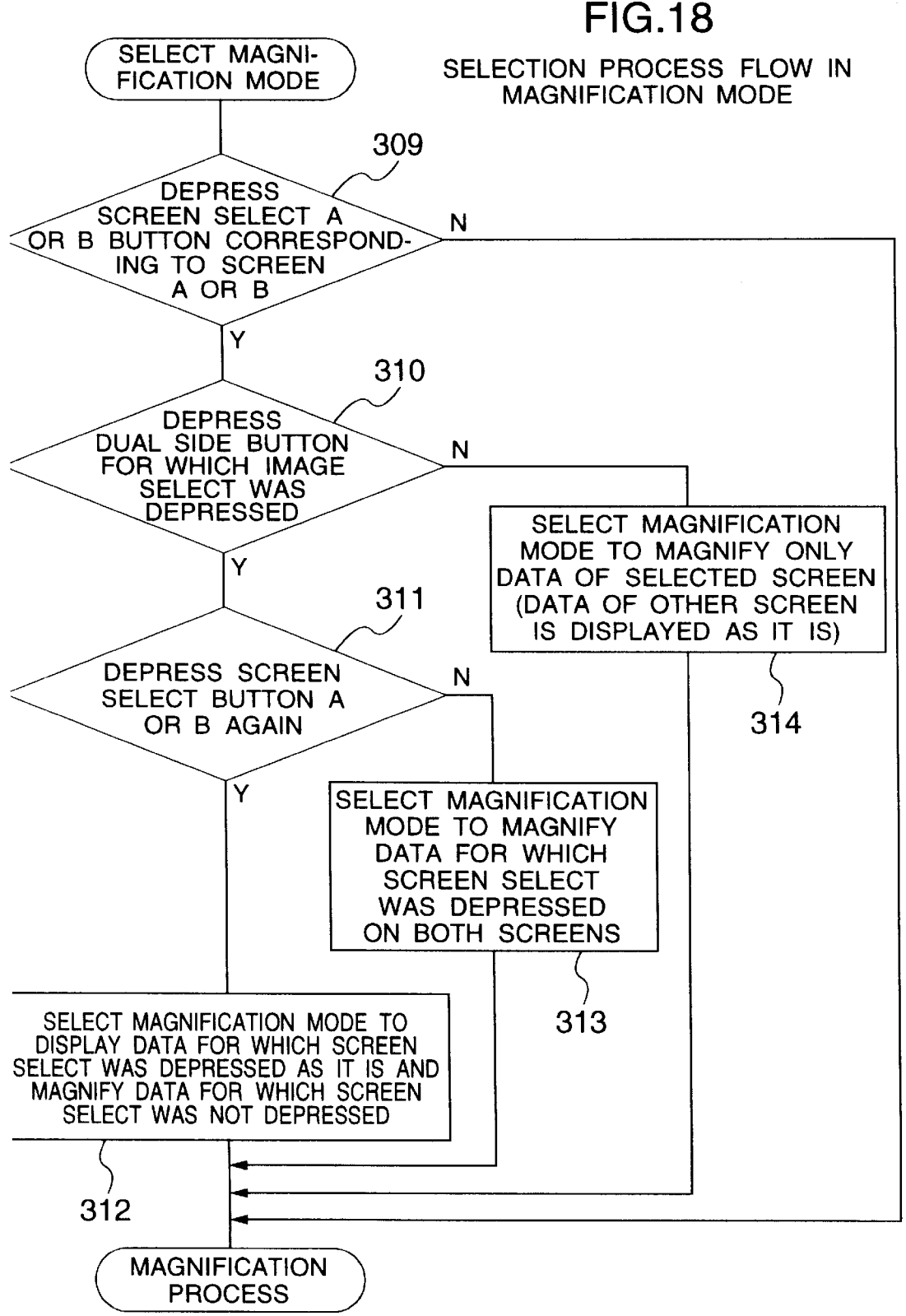
FIG. 18 shows selection of a magnification process of the image display device of the present invention.
Figure 19:
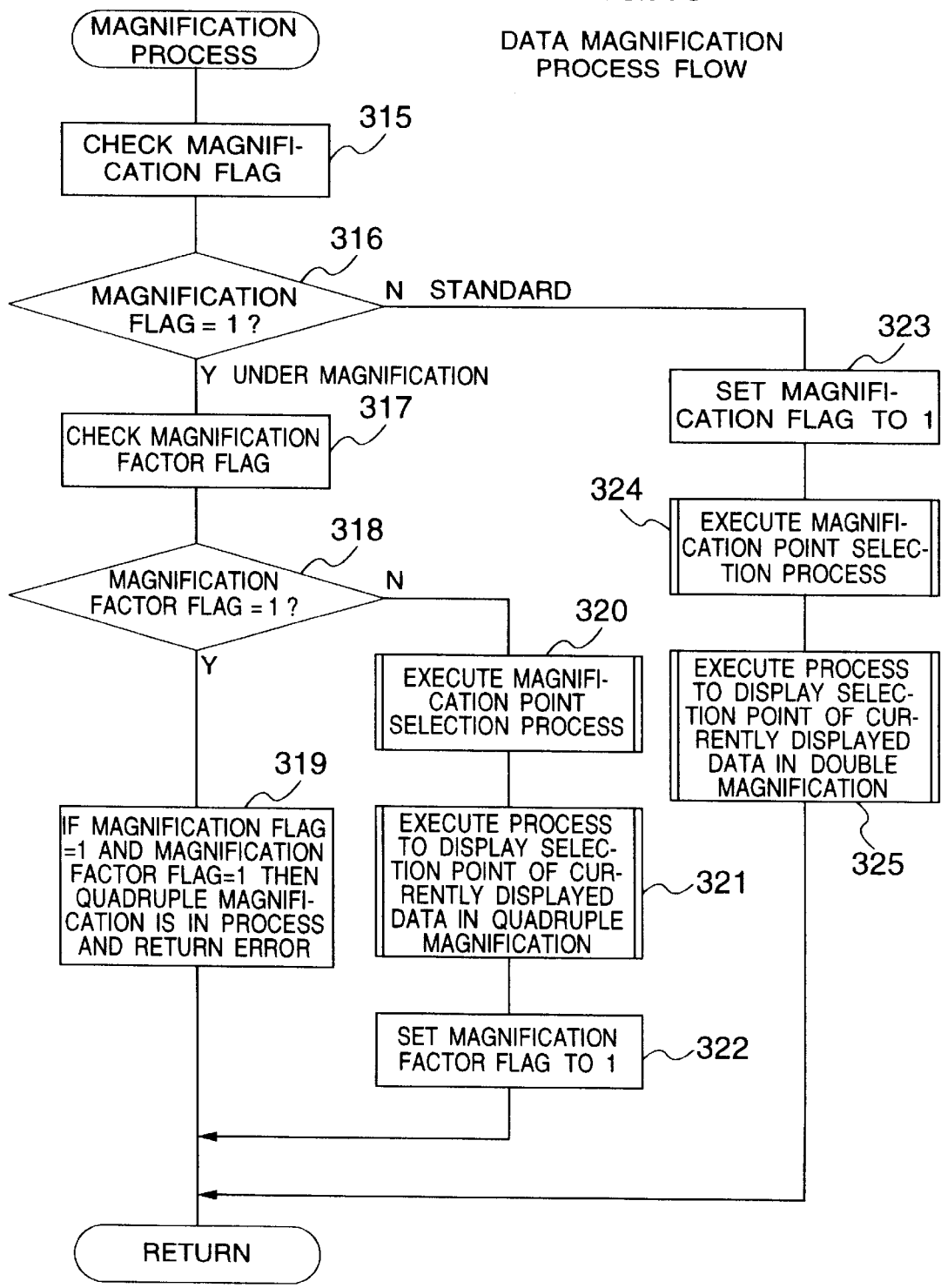
FIG. 19 shows a flow chart of a data magnification process of the image display device of the present invention.
Figure 22:
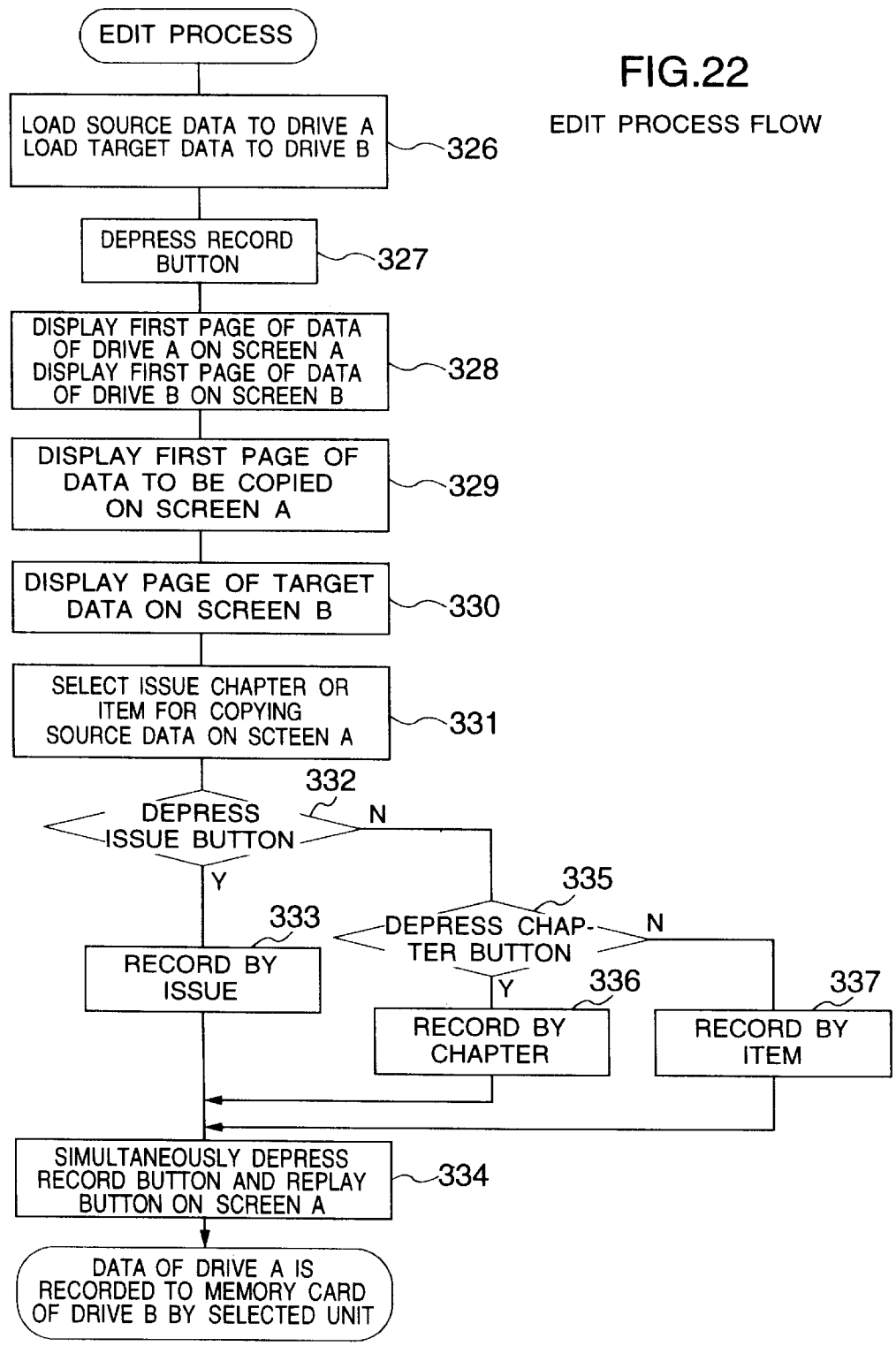
FIG. 22 shows a flow chart of a record process of display data of the image display device of the present invention.

For the start of the screen, the power supplies for the two LCDs 54 are provided independently. In the present embodiment, the power of the LCD 54-1 is turned on and the power of the LCD 54-2 may be turned off. The one-screen display mode (the dual-screen integral display mode) in which the powers of the LCDs 54-1 and 54-2 are turned on to conduct the dual-screen display and the mode (the dual-screen display mode) in which the dual-screen LCDs are displayed are provided. Further, only one of the LCDs 54-1 and 54-2 is displayed and the power of the other screen may be turned off. In any mode, the portrait or landscape display of the display screen may be selected. A flow chart of the image display process in the screen start mode is shown in FIG. 16.

The reading, recording and erasing of data by book are conducted for the magneto-optical disk and the reading (updating) of page or chapter in the book is conducted for the IC memory card. The reading (updating) of page or chapter in the book conducted for the IC memory card includes the page updating for updating the displayed page and the chapter updating for updating the chapter included in the displayed page to one previous or succeeding chapter and displaying the top page thereof.

When the IC memory card having the document recorded therein is newly mounted and the page updating or chapter updating button is depressed immediately thereafter, the first page of the first chapter of the IC memory card is displayed in the reduced screen.

[Page Updating]

The system to display the data transferred from the record medium to the memory for updating is explained with reference to FIGS. 34–36. The following operation is conducted by the previous and next item buttons 70 and 69.

Paging (including back-paging)

When two continuous pages are displayed on the two LCDs 54, the two screens are substituted by different data by paging the images displayed on the two screens. For example, when pages 3 and 4 are displayed, pages 5 and 6 are paged and displayed. The reverse mode may also be conducted (see FIG. 35B).

Page Increment (including page decrement)

When two continuous pages are displayed on the two LCDs, only the first page is disappeared from the display and the next page is moved to the screen on which the disappeared page was displayed and the next new page is displayed. For example, when pages 2 and 3 are displayed, pages 3 and 4 are newly displayed. The reverse mode may also be conducted (see FIG. 35C). One-LCD One-Page Increment (including decrement):

When two LCDs are displayed independently, the display data of only the page of the selected LCD is totally updated to display the next new page. For example, when pages 2 and 3 are displayed and the LCD which display the page 2 is selected, the page 2 is changed to the page 3 while the display of the page 3 on the other screen remains unchanged. The page decrement is conducted in the same manner (see FIG. 36B).

Two-LCDs One-Screen Page Increment (including Decrement)

When two LCDs are combined to one for display, the data displayed on the one screen continuous to the two screens is totally updated and one-screen display is conducted for the next page (see FIG. 35A).

[Edit 1]

Only the desired data in the IC card memory of the driver A (or B) is stored in the IC memory card of the driver B (or A) by using the record and replay buttons 79 and 60 in the console panel 519 and using the two IC memory card sockets as the drivers A and B to edit the data. In this case, the display of the LCDs 54-1 and 54-2 is made for the drivers A and B.

For example, the IC memory card on which the original record data is recorded is inserted to the driver A and the IC memory card to which the data is to be transferred is inserted to the driver B. The data in the IC memory card mounted in the driver A is displayed on the LCD corresponding to the driver A, the data to be transferred to the driver B is selected. The page or chapter (which is set) which contains the displayed image is the selected data. The data in the IC memory card in the driver B to which the data is to be transferred is displayed on the LCD corresponding to the driver B for the selection of the transfer destination. The data in the IC memory card of the driver B is overwritten from the page or chapter (which is set) which contains the displayed screen. The data may be overwritten from the next to the page or chapter which contains the displayed screen. Since the data amount of the chapter is not fixed, the last of the overwritten data may be an intermediate portion of a chapter in the IC memory card of the driver B. In this case, the data of the next chapter is erased by overwriting and saved only from the intermediate portion.

In the above, the display of the LCDs 54-1 and 54-2 is made for the drivers A and B. Alternatively, the LCDs 54-1 and 54-2 may be combined in one screen and the data may be transferred. First, the display for the driver A is made and the data to be transferred to the driver b is selected. Next, the data in the driver B is displayed in one screen combined with the LCDs 1 and 2 and the transfer destination is selected. In this manner, the edition of the data of the column of a large image including fine characters which is hard to display solely by the LCD 1 or 2, such as a newspaper can be readily made.

In this manner, the drivers A and B fit to both the case where the respective LCDs are used independently and the case where the two screens are used as one screen.

[Edit 2]

The edit method when the magneto-optical disk is used as the recording media in the present embodiment is explained. The IC memory card is mounted on the IC memory card driver of the display device and the driver for the magneto-optical disk is connected to the interface of the display device. SCSI-2 is adopted as the driver interface of the present device.

(1) Data Transfer from magneto-Optical Disk to IC Memory Card

In the read operation of data book by book from the magneto-optical disk, the book updating is included in which the book (one book of documents) which contains the displayed page is updated by the immediately previous or succeeding book in the order arranged in the magneto-optical disk and the top page thereof is updated. Since the displayed book is transferred to the IC memory card, the data on the IC display card which was previously present is erased by overwriting. When the data is stored in the magneto-optical disk, the original magneto-optical disk is first mounted on the magneto-optical disk driver and the data is transferred to the IC memory card from the magneto-optical disk. When the data of the magneto-optical disk is to be transferred to another magneto-optical disk, the data is transferred from the magneto-optical disk which contains the data to the IC memory card and then the magneto-optical disk in the driver is taken out and the magneto-optical disk to which the data is to be written is inserted. Then, the data in the IC memory card is transferred to the magneto-optical disk. Since the transfer is made by only the capacity of the IC memory card, the transfer is made several times if the data above the capacity is to be transferred.

(2) Data Transfer from IC Memory Card to Magneto-optical Disk

One book of IC memory card on display may be recorded on the magneto-optical disk one book at a time in the order of arrangement of documents. When the original data is included in the IC memory card, the magneto-optical disk driver is connected and the data is transferred from the IC memory card to the magneto-optical disk.

In other embodiment, only one IC memory card driver is provided in the present display device. In this case, when the data in one IC memory card is to be transferred to other IC memory card, the data is transferred to the magneto-optical disk and then the original IC memory card mounted on the IC memory card driver provided in the display device is replaced by the IC memory card to which the data is to be written. Then, the data is transferred from the magneto-optical disk to the IC memory card.

In the above embodiment, the display area and the resolution of the LCD may be compensated by the two display screens.

By using the dual-screen independent display mode in which the two display screens are independent and the dual-screen integral display mode in which the two screens are combined in one are used to display small books such as BUNKO-size or SHINSHO-size books as well as A2-size column information such as newspaper with a high resolution.

The display screen is of spread type display like the form of book and it may be folded when it is carried and spread when it is used. Thus, the portability is high. Accordingly, the present device may be used as the display device which takes place of the book without sense of different medium, several books of electronic media information may be displayed and the display device which has the same compactness and portability as those of the book is provided. By changing the display mode as the user desires, the display appropriate to the user may be attained.

In accordance with the embodiments of the present invention, since two LCDs of wide display screens are provided, the image may be displayed in the manner of spread pages of the book and the LCD screens amy be displayed in various modes depending on the type of book and the display data, including portrait display or landscape display on the LCD screens, the one-screen independent display mode or the dual-screen integral display mode. In this manner, the display which fits to the display data is attained and the user may read the image in his desired display mode and a large volume of data may be displayed while compensating the resolution of the LCD.

Accordingly, the image display device which may be used as the image display device which takes place of the book without sense of different medium, can display several books of electronic media information by exchanging the record media and has the display function similar to that of the book is provided.

In accordance with the embodiments of the present invention, two LCDs of wide display screens are used and only one LCD display screen is used for magnification and the other display screen displays the unmagnified display data, or the display data displayed on one LCD display screen is displayed on the LCD dual-screen to further magnify the data to permit to read the data which is hard to read with the resolution of the LCD by the utilization of the display screens or in the display mode of user's desire by the magnification and reduction operation. The display screen may be spread like the form of the book and the device may be folded when it is carried and spread when it is used. Thus, it is suitable for carrying.

Accordingly, the display device which can be used to take place of the book without sense of different medium, can display several books of electronic media information and has same compactness and portability as those of the book is provided.

What is claimed is:

1. An image display device comprising:
a first record medium mount unit and a first record medium driver unit for mounting a first record medium having image information recorded thereon as electronized compressed image data;
a second record medium mount unit and a second record medium driver unit for mounting a second record medium having image information recorded thereon as electronized compressed image data;
a display unit including first and second display screens;
an electronic circuit unit for reading a predetermined amount of record data from said first record medium and said second record medium mounted on said first record medium mount unit and said second record medium mount unit, and supplying said predetermined amount of record data to said display unit;
a console unit for determining a display mode and a display form to said display unit of the read data;
a portable and foldable book type main body for accommodating said first record medium mount unit, said second record medium unit, said display unit, said electronic circuit unit and said console unit;
said console unit having a first and a second screen selection buttons for selecting said first display screen and said second display screen, a first and a second replay button for displaying data stored in said first record medium and said second record medium provided in said first record medium driver unit and said second record medium driver unit on said first display screen and said second display screen, and a dual screen button for displaying data stored in said first record medium and said second record medium provided in said first record medium driver unit and said second record medium driver unit on both of said first display screen and said second display screen;
said electronic circuit including a control unit so as to display data stored in said first record medium on said first display screen when said first screen selection button corresponding to said first display screen and provided in said console unit is in an operation, so as to display data stored in said second record medium on said second display screen when said second screen selection button corresponding to said second display screen and provided in said console unit is in an operation, and so as to display either data stored in said first record medium or data stored in said second record medium over said first display screen and said second display screen when said first screen selection button or said second screen selection button and said dual screen button are in an operation;
said book-type main body having the first and second display screens of said display unit combined as dual-screen independent display screen and/or dual-screen integral display screen and used as a double door, and said first record medium mount unit and said first record medium driver unit being arranged at one of said double door, and an electronic circuit board constituting said electronic circuit being arranged at the other of said double door;
said first display screen being arranged above said first record medium mount unit and said first record medium driver unit, and said second display screen being arranged above said second record medium mount unit and said second record medium driver unit;
said book-type main body being opened to exhibit said first display screen and said second display screen when said first display screen and said second display screen are used, said first display screen and said second display screen being disposed in contact or in an adjacent configuration as if said first display screen and said second display screen were one screen, and either data stored in said first record medium or data stored in said second record medium being able to be displayed over both said first display screens and said second display screen in a predetermined size; and said first display screen and said second display screen being folded when said first display screen and said display screen are not used, and being arranged to be portable.

2. An image display device according to claim 1, wherein electric sources for driving said electronic circuit are disposed at both a left bottom portion and a right bottom portion of said book-type main body so as to keep a weight of a balance and to be portable.

3. An image display device according to claim 1, wherein a thickness of said display unit of said book-type main body is equal to or smaller than 20 mm.

4. An image display device according to claim 1, wherein a display area of said first display screen is the same as that of said second display screen.

5. An image display device according to claim 1, wherein said display unit has two reflection type LCDs including a LCD driver unit for driving said LCD, and said LCDs are inverted at an upper position and a lower position, and opposite portions of said LCD driver units are disposed in contact or adjacently so as to display said first display screen and said second display screen as one display screen.

6. An image display device according to claim 1, wherein said main body comprises an external interface distinct from said first record medium driver and said second medium driver, and a driver unit for storing data transmitted from an external apparatus to said external interface to one or both of said first record medium and said second record medium using said electronic circuit.

7. An image display device comprising:
a first record medium mount unit and a first record medium driver unit for mounting a first record medium having image information recorded thereon as electronized compressed image data;
a second record medium mount unit and a second record medium driver unit for mounting a second record medium having image information recorded thereon as electronized compressed image data;
a display unit including first and second display screens;
an electronic circuit unit for reading a predetermined amount of record data from said first record medium and said second record medium mounted on said first record medium mount unit and said second record medium mount unit, and supplying said predetermined amount of record data to said display unit;
a console unit for determining a display mode and a display form to said display unit of the read data;
a portable and foldable book type main body for accommodating said units;
said console unit having a first and a second screen selection buttons for selecting said first display screen and said second display screen, a first and a second replay button for displaying data stored in said first record medium and said second record medium provided in said first record medium driver unit and said second record medium driver unit on said first display screen and said second display screen, and a dual screen button for displaying data stored in said first record medium and said second record medium provided in said first record medium driver unit and said second record medium driver unit on both of said first display screen and said second display screen;
said electronic circuit including a control unit so as to display data stored in said first record medium on said first display screen when said first screen selection button corresponding to said first display screen and provided in said console unit is in an operation, so as to display data stored in said second record medium on said second display screen when said second screen selection button corresponding to said second display screen and provided in said console unit is in an operation, and so as to display either data stored in said first record medium or data stored in said second record medium over said first display screen and said second display screen when said first screen selection button or said second screen selection button and said dual screen button are in an operation;

said book-type main body having the first and second display screens of said display unit combined as dual-screen independent display screen and/or dual-screen integral display screen and used as a double door, and said first record medium mount unit and said first record medium driver unit being arranged at one of said double door, and an electronic circuit board constituting said electronic circuit being arranged at the other of said double door;

said first display screen being arranged above said first record medium mount unit and said first record medium driver unit, and said second display screen being arranged above said second record medium mount unit and said second record medium driver unit;

said book-type main body being opened to exhibit said first display screen and said second display screen when said first display screen and said second display screen are used, said first display screen and said second display screen being disposed in contact or in an adjacent configuration as if said first display screen and said second display screen were one screen, and either data stored in said first record medium or data stored in said second record medium being able to be displayed over both said first display screens and said second display screen in a predetermined size; and said first display screen and said second display screen being folded when said first display screen and said second display screen are not used, and being arranged to be portable wherein said first and second magnification lenses arranged below said first and second display screens in parallel to the screens; and a mechanism to lift said first and second magnification lenses such that the opposing sides of said first and second magnification lenses appear to contact to each other and the first and second display screens of said display unit appear as one display screen.

8. An image display device according to claim 6 wherein the sizes of said first and second magnification lenses are larger than the sizes of said first and second display screens.

9. An image display device according to claim 7, wherein said first and second magnification lenses are arranged at positions meeting the relation of the formula $$L/(L+\Delta L)=1-(b/f)$$

where b is a distance between the first and second display screens and the first and second magnification lenses, L is a length extending from one and the other of the opposing sides of the display screen toward the opposing sides, f is a focal distance of the lens and $\Delta L$ is one half of the opposing distance between the opposing sides of the first and second display screens.

* * * * *